(12) United States Patent
Qureshi et al.

(10) Patent No.: US 7,660,904 B2
(45) Date of Patent: Feb. 9, 2010

(54) PROVIDING KEYS TO SHARE DATA WITHIN AN INSTANT MESSAGING SESSION

(75) Inventors: Imran Qureshi, Milpitas, CA (US); Evan Gridley, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 826 days.

(21) Appl. No.: 10/842,753

(22) Filed: May 11, 2004

(65) Prior Publication Data

US 2005/0267975 A1 Dec. 1, 2005

(51) Int. Cl.
*G06F 15/16* (2006.01)
(52) U.S. Cl. .................. 709/229; 709/227; 709/228; 709/230; 709/231; 709/232
(58) Field of Classification Search .................. 709/229
See application file for complete search history.

(56) References Cited

U.S. PATENT DOCUMENTS

| 7,120,672 | B1 * | 10/2006 | Szeto et al. | 709/206 |
|---|---|---|---|---|
| 7,383,308 | B1 * | 6/2008 | Groves et al. | 709/206 |
| 2003/0002521 | A1 * | 1/2003 | Traversat et al. | 370/465 |
| 2003/0018725 | A1 * | 1/2003 | Turner et al. | 709/206 |
| 2004/0107256 | A1 * | 6/2004 | Odenwald et al. | 709/205 |
| 2007/0162589 | A1 * | 7/2007 | Riddle | 709/223 |

FOREIGN PATENT DOCUMENTS

| WO | WO0201823 A | 1/2002 |
|---|---|---|
| WO | WO0217101 A | 2/2002 |

* cited by examiner

*Primary Examiner*—Jeffrey Pwu
*Assistant Examiner*—Abdelnabi O Musa
(74) *Attorney, Agent, or Firm*—Lee & Hayes, PLLC

(57) ABSTRACT

Sharing data within an instant messaging session is described. A user participating in an instant messaging session may request a data access key. The key, which provides access to data associated with the user, may then be transmitted via the instant messaging session to one or more other participants in the instant messaging session. The other instant messaging session participants can then use the key to access, via the instant messaging session, the data associated with the user. Users may be granted various levels of access to another user's data.

40 Claims, 23 Drawing Sheets

Figure 7

PROVIDING KEYS TO SHARE DATA WITHIN AN INSTANT MESSAGING SESSION

TECHNICAL FIELD

This invention relates to instant messaging, and more specifically to sharing data within an instant messaging session.

BACKGROUND

Electronic calendars have become a common tool used by individuals to track meetings, appointments, and other scheduled events. When scheduling an event that is to include multiple individuals, the person scheduling the event may or may not have access to view calendars or schedules associated with the other individuals to be invited to the event. When a user schedules an event, indicating one or more other individuals to be in attendance, an email message is typically sent to the other users, and the other users can each either accept or decline the meeting request. Because of the delay that may occur between the time that one user schedules an event and the time at which the other attendees have checked their email and responded to the meeting request, it is possible that either the scheduled meeting time will have passed or that one or more of the attendees may have scheduled or been invited to attend a conflicting event. If this happens, the meeting may then need to be re-scheduled, and the scheduling process must be started again. In addition, because the initiating user may not get an answer right away, he typically needs to also schedule personal time to check for email responses to determine whether the meeting has been accepted or if it needs to be rescheduled.

Instant messaging is an increasingly popular communication tool that enables two or more users to exchange real-time text messages via a network or peer-to-peer connection. Instant messaging differs from email in that instant messages are exchanged in real-time between two users who are online at the same time. On the other hand, email messages may be exchanged between one user who is online at the time the message is created and another user who may not be online to check email until much later.

While instant messaging is an effective tool for communication, it does not support some of the other tasks that may naturally flow from a real-time communication. For example, if two users are engaged in an instant messaging conversation, and decide to schedule a time to meet in person, each user may need to consult a personal calendar, and a significant amount of time may be spent exchanging scheduling information before being able to identify a time that both users are available to meet. This scenario becomes even more difficult if more than two individuals are participating in an instant messaging conversation and want to schedule a time to get together in person.

Accordingly, a need exists for an instant messaging session tool that enables users to easily share information, such as calendar data, in real-time.

SUMMARY

Techniques for enabling data sharing within an instant messaging session are described. Users participating in an instant messaging session can submit through the instant messaging session, a request for a data access key that provides access to a user's data, such as personal calendar data. The keys are then exchanged between the users through the instant messaging session. The key exchange enables the users participating in the instant messaging session to access one another's data.

When users have access to one another's data, other tasks may also be performed. For example, in addition to viewing one another's calendar data, users may also schedule a meeting to be added to the instant messaging session participants' calendars. Meeting invitations are distributed and users can accept or decline the meeting within the instant messaging session.

BRIEF DESCRIPTION OF THE DRAWINGS

FIG. 7 is a pictorial diagram of an exemplary instant messaging user interface screen through which a user may change the date for which shared calendar data is displayed.

DETAILED DESCRIPTION

Overview

The embodiments described below provide techniques for sharing data within an instant messaging session. The described exemplary implementation enables users to share calendar data and schedule meetings within an instant messaging session. It is recognized, however, that the techniques described herein are not limited to enabling the sharing of calendar data, but that they may be used to enable other types of data sharing and related tasks that may also be performed via an instant messaging session.

In the described exemplary implementation, when two users are communicating via an instant messaging session, one of the users can initiate a calendar sharing request that, if accepted by the other user, causes the instant messaging user interface to display calendar information associated with both users. Both users are then able, within the instant messaging user interface, to browse both users' calendars simultaneously. Either user is then also able to schedule a meeting to be attended by both users. Because the meeting is scheduled through an instant messaging session, both users can accept the meeting, and the meeting is promptly scheduled in both users' calendars.

Access to a user's calendar data is controlled by the use of an encrypted key. When a user requests a key to access their personal calendar data, the key can then be given to another user to grant the other user permission to view the calendar data. By exchanging data access keys within an instant messaging session, a user can give another user temporary access to their calendar data. That is, the key that is shared can be configured to expire at a pre-determined time, or based on some other criteria (e.g., when the instant messaging session is closed). Because the data is shared within an instant messaging session, communication based on the shared data can also be facilitated. For example, when scheduling a meeting to be added to another user's calendar, a meeting invitation can be sent and a confirmation can be received via instant messaging, rather than through email.

Instant Messaging Scenario

Figure 1:
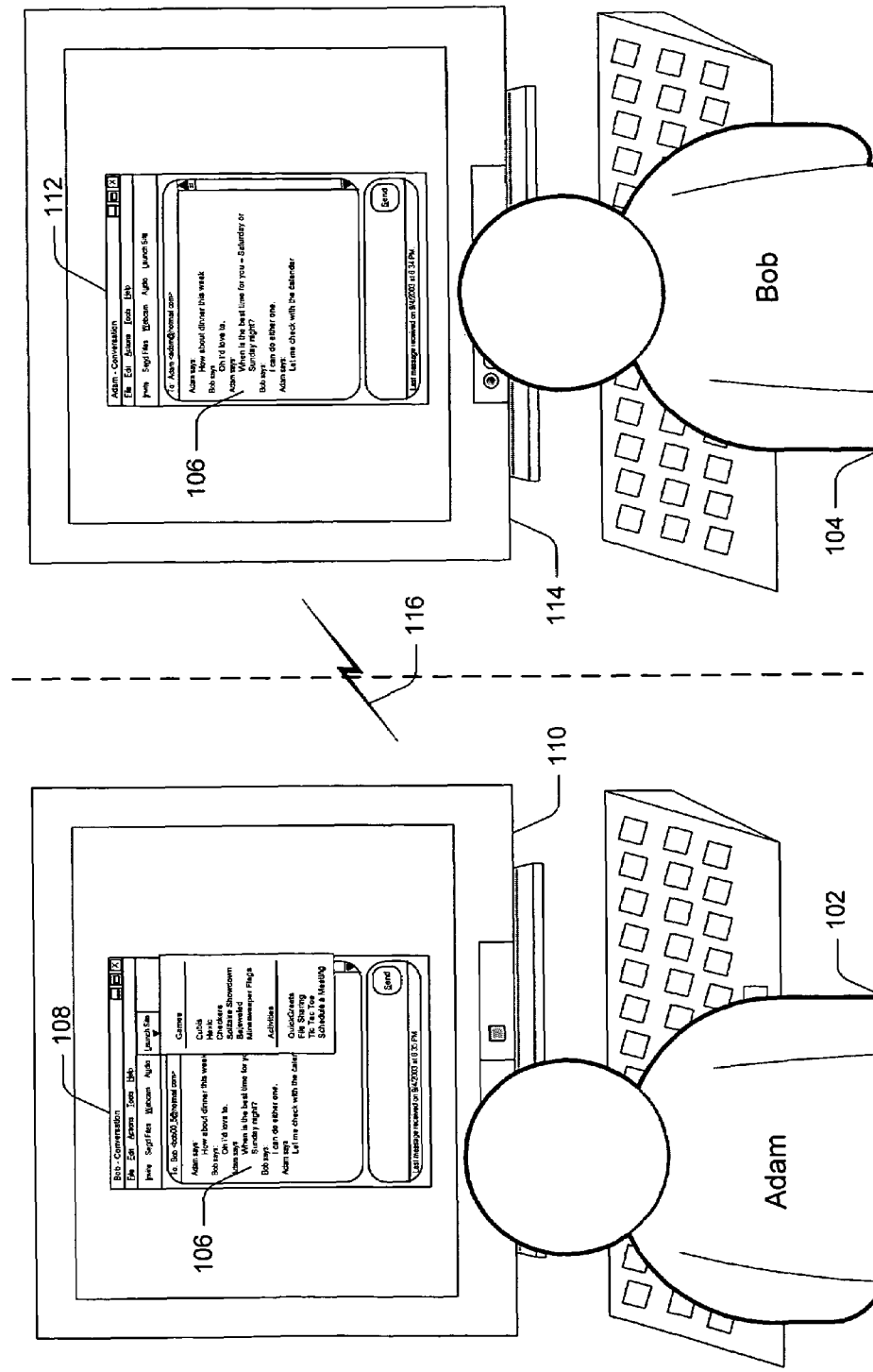
FIG. 1 is a pictorial diagram that illustrates two users communicating via an exemplary instant messaging session within which calendar sharing and meeting scheduling may be performed.

FIG. 1 illustrates an exemplary instant messaging session through which calendar sharing and meeting scheduling may be performed. A first user (Adam) 102 and a second user (Bob) 104 are engaged in an instant messaging conversation 106. Text associated with instant messaging conversation 106 is displayed to Adam 102 in instant messaging user interface 108, which is presented to Adam 102 through computer system 110. Similarly, text associated with instant messaging conversation 106 is displayed to Bob 104 in instant messaging user interface 112, which is presented to Bob 104 through computer system 114. The text messages that are exchanged are transmitted between computer system 110 and computer system 114 via connection 116, which represents, for example, a network connection or peer-to-peer connection.

Although illustrated and described with only two individuals participating in an instant messaging session, it is recognized that the techniques described herein may also be applied to scenarios in which three or more individuals are participating in an instant messaging session.

User Interface

Figure 2:
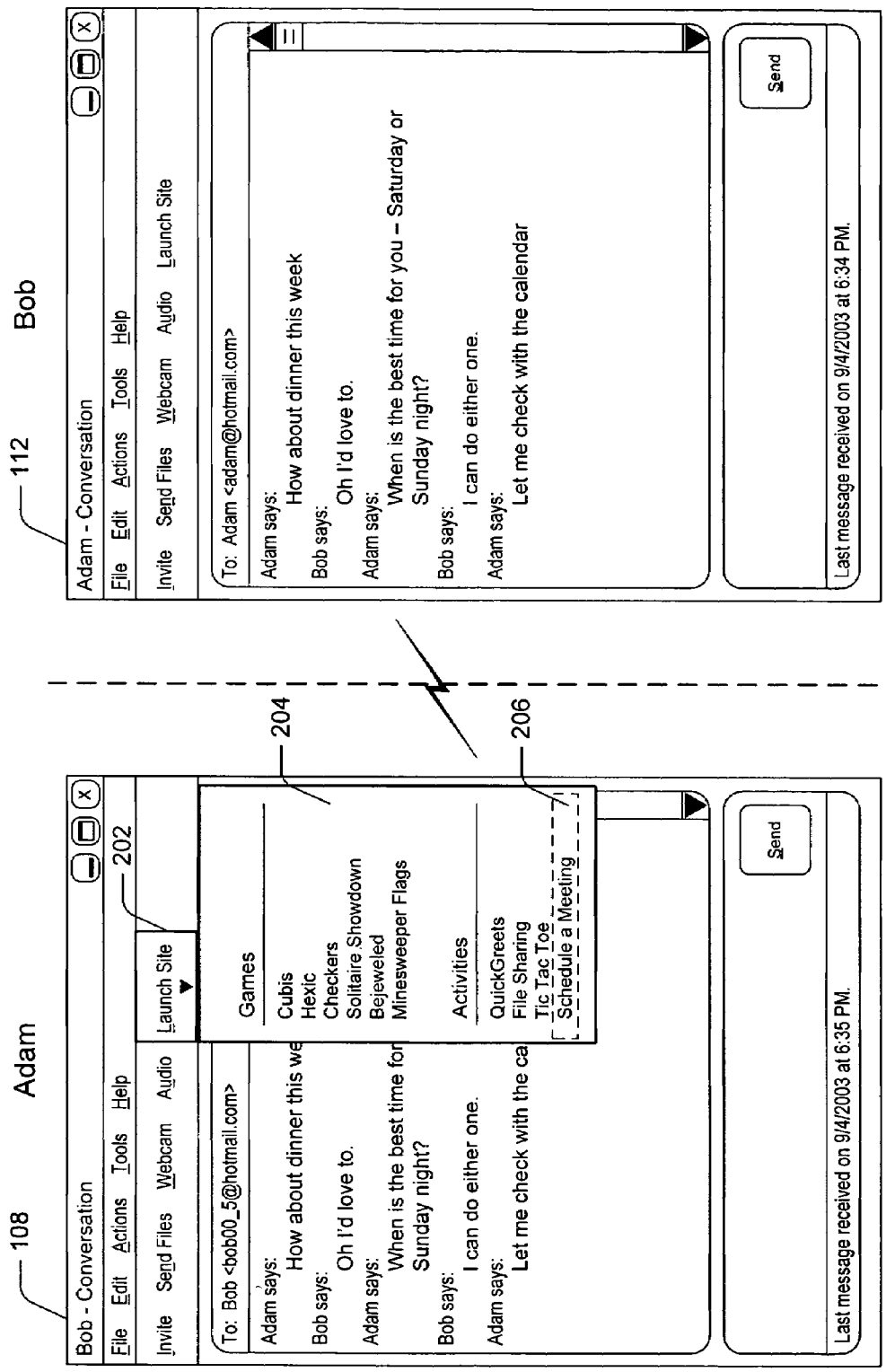
FIG. 2 is a pictorial diagram of an exemplary instant messaging user interface screen through which calendar sharing may be initiated.

FIGS. 2-11 illustrate exemplary user interface screens to support calendar sharing and meeting scheduling within the instant messaging session illustrated in FIG. 1. FIG. 2 illustrates an exemplary instant messaging user interface screen through which calendar sharing may be initiated. In the illustrated instant messaging session, Adam 102 and Bob 104 have exchanged dialog, and have agreed to meet for dinner later in the week. When trying to agree on a day, Adam 102 indicates that he will check the calendar. At this point, Adam 102 selects, for example, a Launch Site menu item 202, which causes a drop-down menu 204 of available activities to be displayed. Adam 102 selects a Schedule a Meeting menu item 206, which causes a calendar sharing invitation to be sent from instant messaging user interface 108 to instant messaging user interface 112.

In an exemplary implementation, if the instant messaging session includes three or more individuals, calendar sharing invitations may be sent to each of the users. Alternatively, a user may specify which instant messaging session participants to include in a calendar sharing session.

Figure 3:
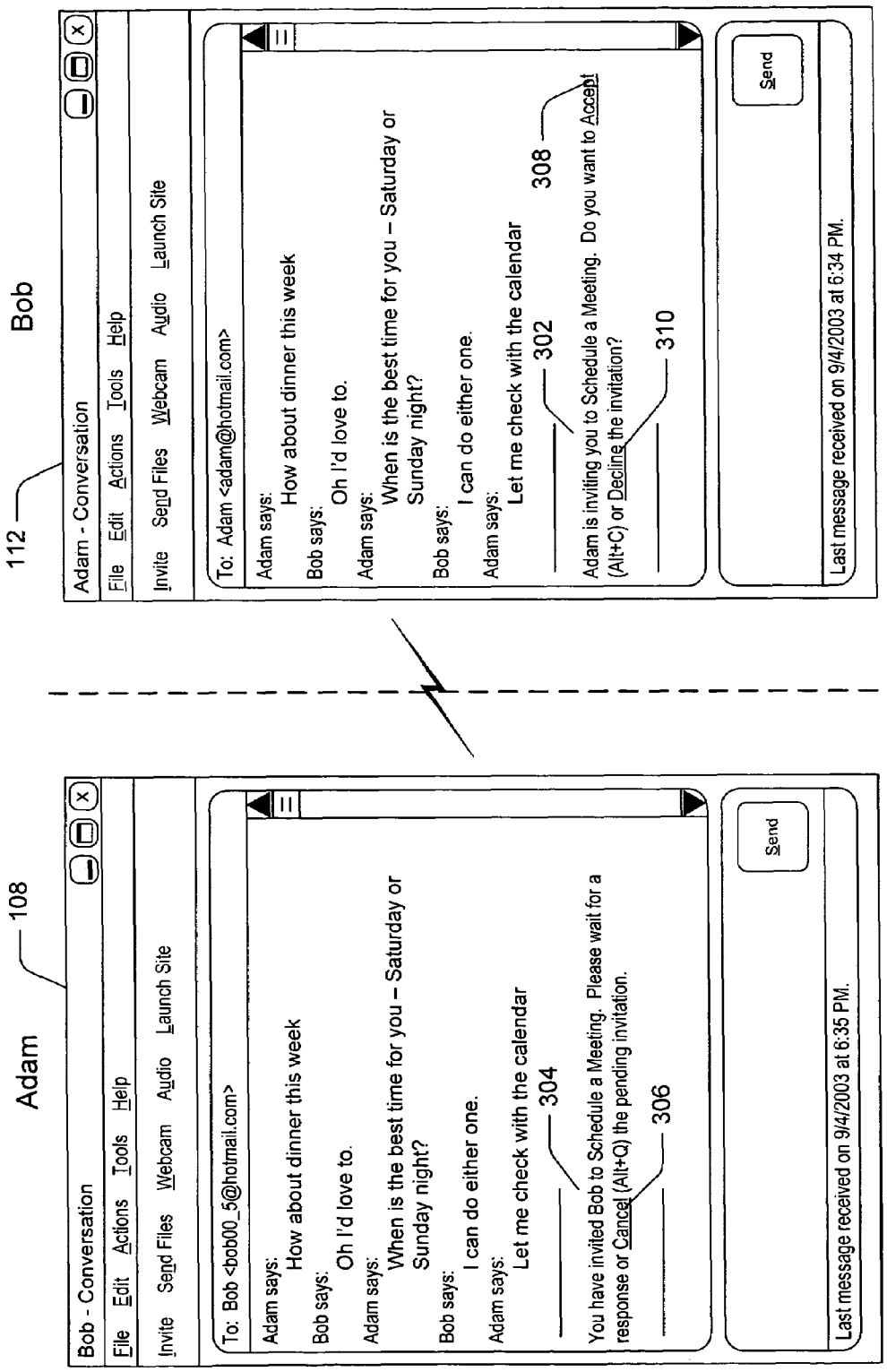
FIG. 3 is a pictorial diagram of an exemplary instant messaging user interface screen through which a calendar sharing invitation may be accepted or declined.

FIG. 3 illustrates an exemplary instant messaging user interface screen through which a calendar sharing invitation may be accepted or declined. As described above, selection of a Schedule a Meeting menu item 206, as illustrated in FIG. 2 causes a calendar sharing invitation 302 to be sent to and displayed to Bob 104 through instant messaging user interface 112. When invitation 302 is sent to instant messaging user interface 112, a confirmation 304 is displayed in instant messaging user interface 108, indicating to Adam 102 that the calendar sharing invitation 302 has been sent to Bob 104. In the illustrated example, Adam 102 can cancel the invitation by selecting the cancel link 306. Similarly, Bob 104 can accept or decline the invitation by selecting the accept link 308 or by selecting the decline link 310, respectively.

Figure 4:
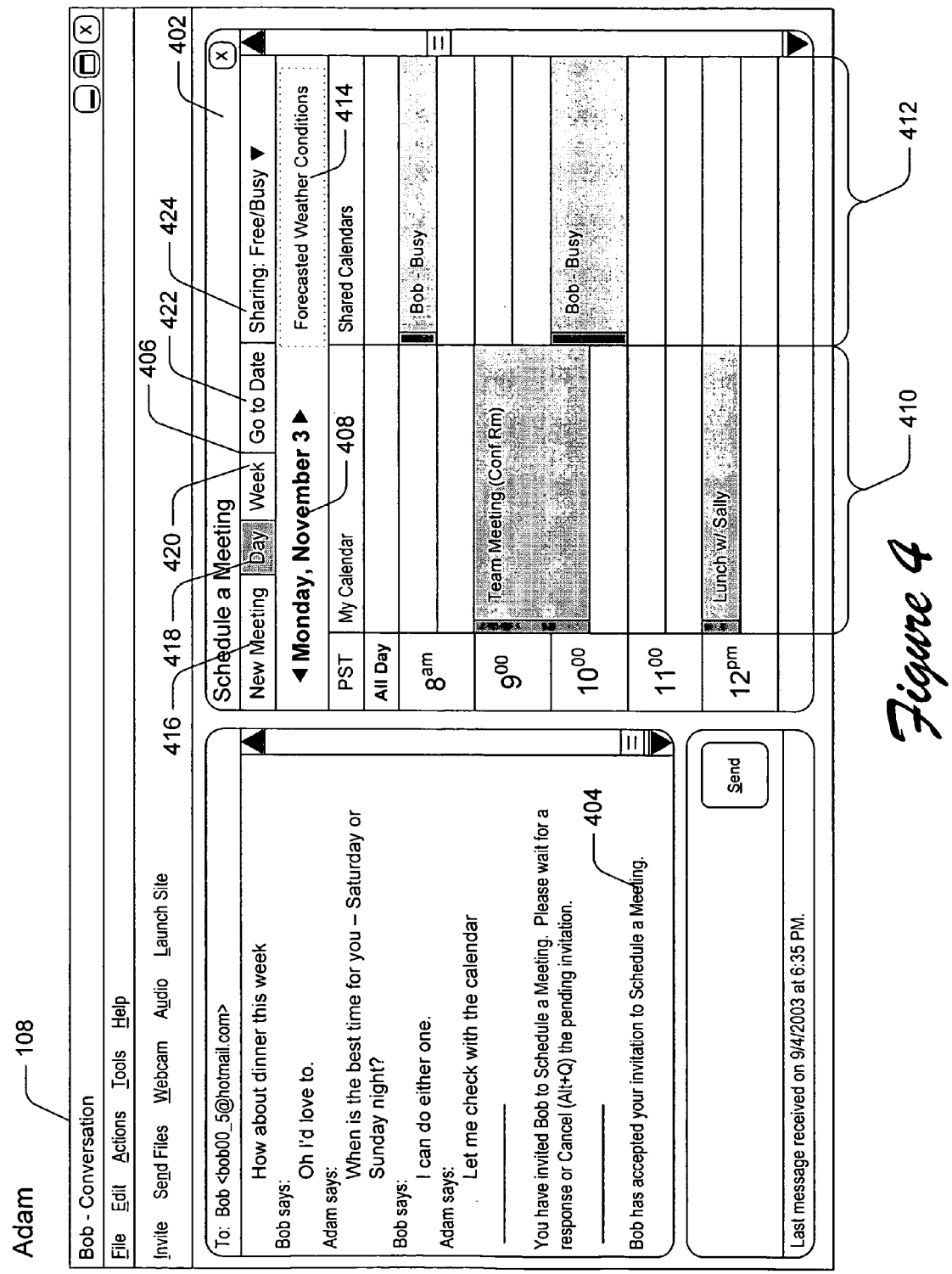
FIG. 4 is a pictorial diagram of an exemplary instant messaging user interface screen that may be used to display shared calendar information to a first user participating in an instant messaging conversation.
Figure 5:
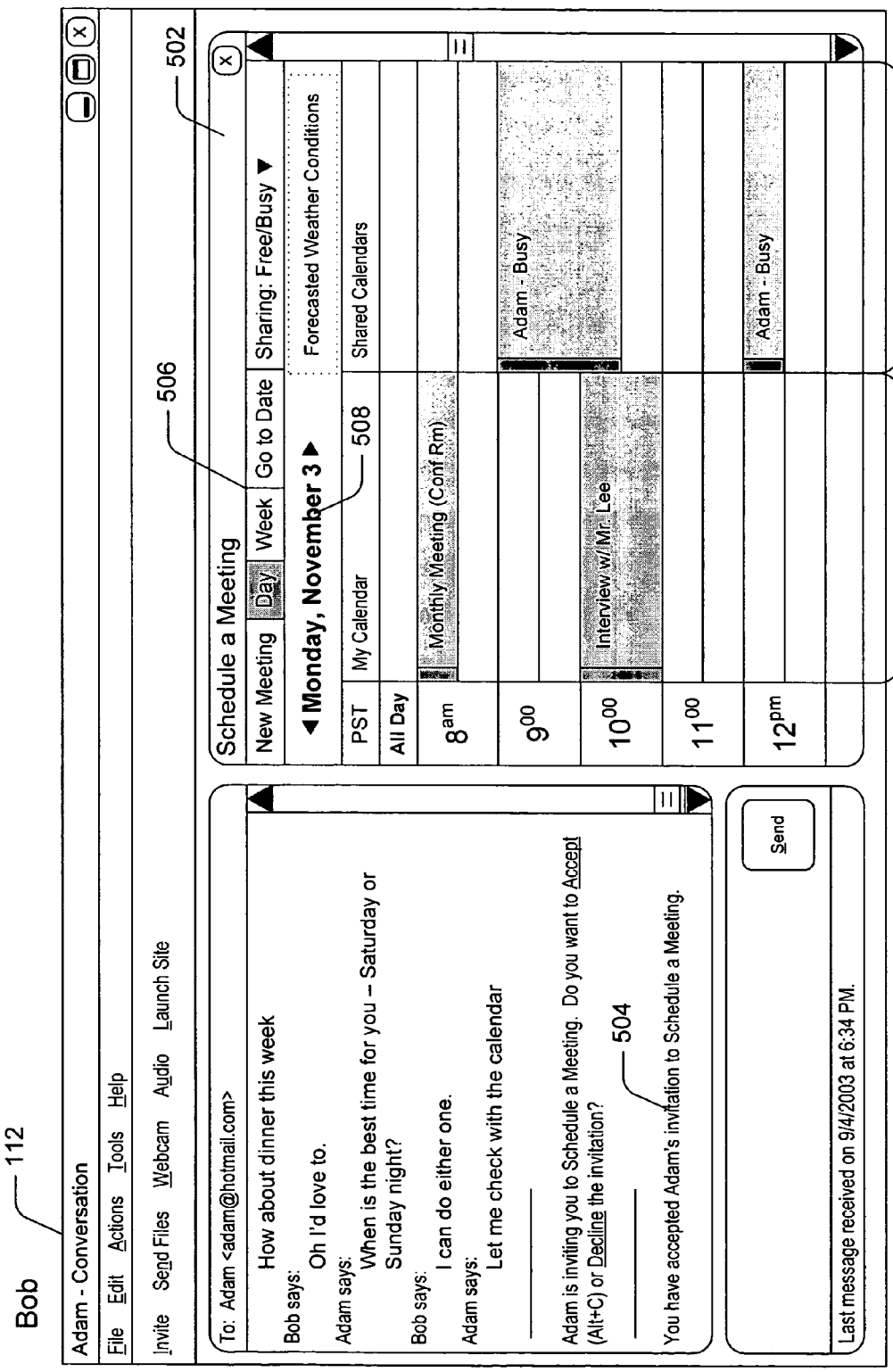
FIG. 5 is a pictorial diagram of an exemplary instant messaging user interface screen that may be used to display shared calendar information to a second user participating in an instant messaging conversation.

FIGS. 4 and 5 illustrate exemplary instant messaging user interface screens through which shared calendar information may be viewed. FIG. 4 illustrates display of shared calendar data through instant messaging user interface screen 108, which is displayed to Adam 102. Similarly, FIG. 5 illustrates display of shared calendar data through instant messaging user interface screen 112, which is displayed to Bob 104. For example, when Bob selects the accept link 308, as illustrated in FIG. 3, Adam's instant messaging user interface 108 (shown in FIG. 4) increases in size to display meeting scheduling area 402. A confirmation 404 that Bob 104 has accepted the invitation to share calendars is also displayed. Meeting scheduling area 402 includes a menu bar 406, a date indicator 408, a current user calendar area 410, and a shared calendar area 412. In an exemplary implementation, meeting scheduling area 402 may also include a forecasted weather conditions area 414 in which weather data associated with the date indicator 408 may be displayed. This may be useful, for example, when users are trying to schedule an outdoor event, such as a barbeque.

In the illustrated example, shared calendar area 412 has a "Shared Calendars" heading. In an alternate implementation, the heading may be dynamically generated to include, for example, the name or names of users whose calendar data is being displayed.

Menu bar 406 includes several selectable items, such as new meeting item 416, day item 418, week item 420, go to date item 422, and sharing item 424. In an exemplary implementation, when a user selects new meeting item 416, a screen is displayed that enables a user to schedule a new meeting to be added to the displayed calendars. Selection of new meeting item 416 is described in further detail below with reference to FIG. 8.

Day item 418 and week item 420 enable a user to toggle the calendar display between a day-at-a-time view and a week-at-a-time view. The illustrated examples are shown with day item 418 selected.

Selection of go to date item 422 enables a user to select another day's calendar information to be displayed. Similarly, selection of the arrows on either side of date indicator 408 cause a next or previous day's calendar information to be displayed (or the next/previous week's information, if the current view is a week view). Selection of go to date item 422 is described in further detail below with reference to FIG. 7.

Selection of sharing item 424 enables a user to select a level of detail associated with their calendar that is displayed to others. Selection of sharing item 424 is described in further detail below with reference to FIG. 6.

As described above, FIG. 5 illustrates display of shared calendar data through instant messaging user interface screen 112, which is displayed to Bob 104 while instant messaging user interface screen 108 (shown in FIG. 4) is displayed to Adam. When Bob selects the accept link 308, as illustrated in FIG. 3, Bob's instant messaging user interface 112 (shown in FIG. 5) increases in size to display meeting scheduling area 502. A confirmation 504 that Bob 104 has accepted the invitation to share calendars is also displayed. Like meeting scheduling area 402, meeting scheduling area 502 also includes a menu bar 506, a date indicator 508, a current user calendar 510, and a shared calendar area 512.

In the display being shown to Adam (illustrated in FIG. 4), Adam's calendar is displayed in current user calendar area 410, and Bob's calendar is displayed in shared calendar area 412. Similarly, in the display being shown to Bob (illustrated in FIG. 5), Bob's calendar is displayed in current user calendar area 510, and Adam's calendar is displayed in shared calendar area 512. As shown in FIG. 4, Adam is able to see details associated with events in his calendar, but only an indicator of when Bob is free or busy in Bob's calendar. Similarly, as shown in FIG. 5, Bob is able to see details associated with events in his calendar, but only an indicator of when Adam is free or busy in Adam's calendar.

If calendar data associated with three or more individuals is shared through an instant messaging session, current user calendar area 410 displays the calendar data associated with the current user and shared calendar area 412 displays the collective calendar data associated with all of the other users.

Figure 6:
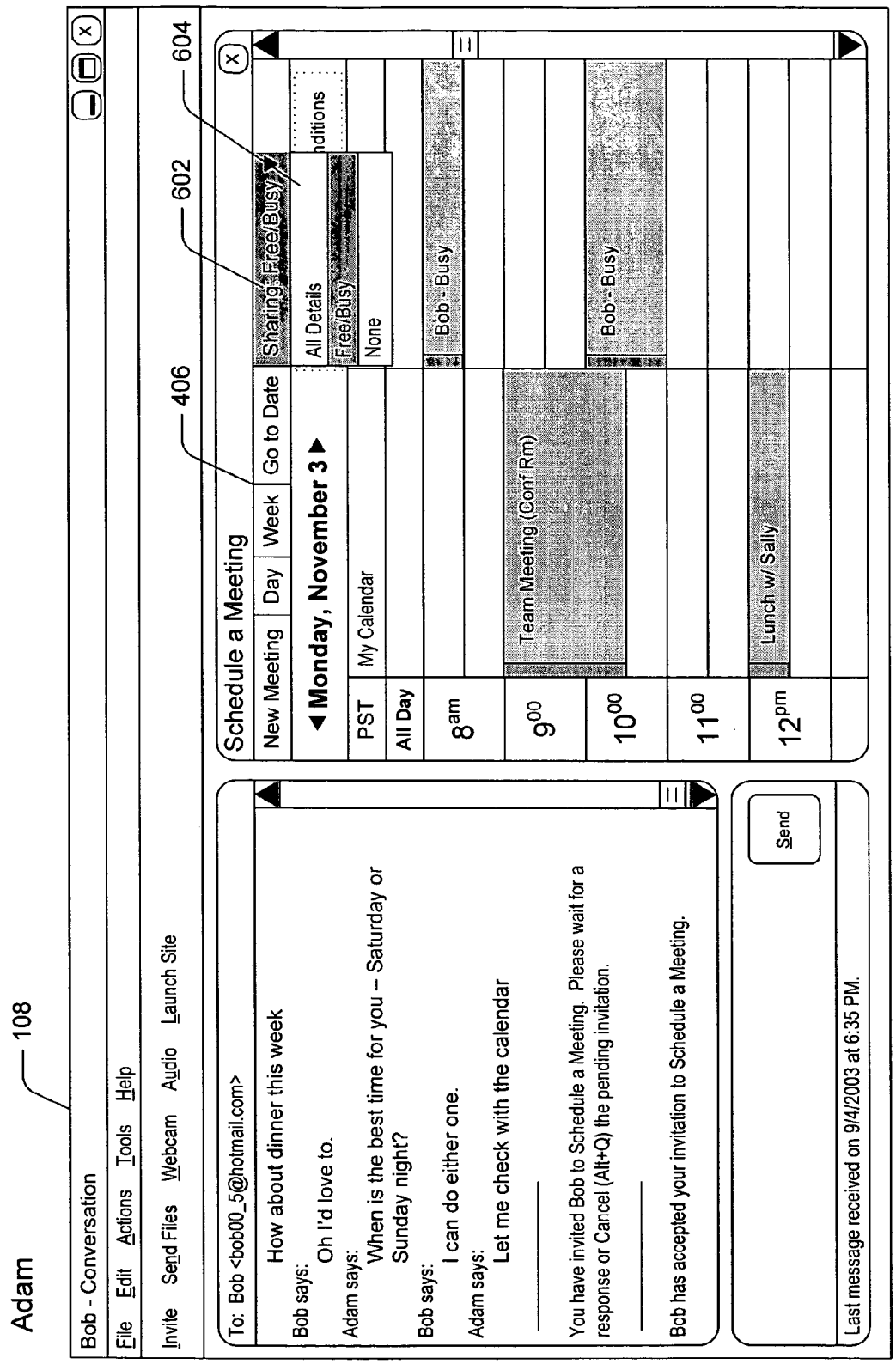
FIG. 6 is a pictorial diagram of an exemplary instant messaging user interface screen through which a user may select a level of detail that is displayed when the user's calendar is shared with others.

FIG. 6 illustrates selection of a menu item that enables a user to select a level of detail that is displayed when the user's calendar is shared with others. For example, Adam 102 may select the sharing menu item 424 from menu bar 406. This causes a drop-down menu 604 to be displayed that includes, for example, three options. An all details option, if selected, causes the same details associated with Adam's calendar that are displayed to Adam to also be displayed to Bob. A free/busy option, which is illustrated as the default selection, causes only an indicator of whether Adam is free or busy to be displayed to Bob. A none option, if selected, causes a representation of Adam's calendar to be displayed to Bob, but with no indicators of scheduled meetings.

It is recognized that in alternate implementations, sharing menu 604 may include more or fewer options than those illustrated. For example, a read/write menu item, when selected, may grant other users permission to directly modify a user's calendar data, without requiring specific confirmation from the data owner.

Figure 7:
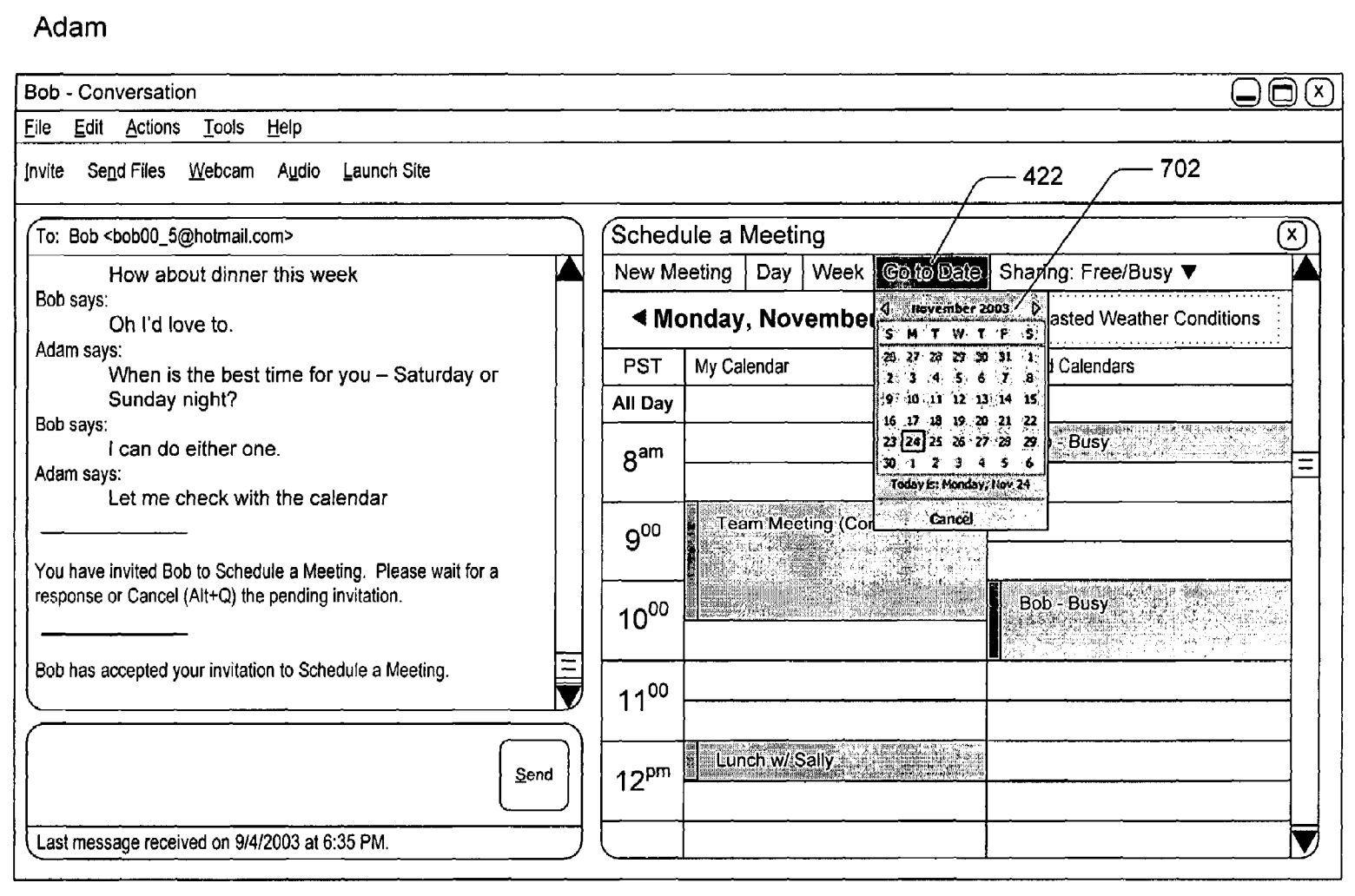

FIG. 7 illustrates selection of a menu item that enables a user to change the date for which calendar data is displayed. For example, Adam 102 may select the go to date menu item 422 from menu bar 406. In the illustrated example, this selection causes a drop-down calendar 702 to be displayed. Adam 102 can then select a date from the calendar, which causes the calendar data that is displayed to change to reflect Adam's and Bob's schedules for the selected date. In the described exemplary implementation, each user (e.g., Adam and Bob) can be simultaneously looking at calendar data for different dates. That is, whatever date Adam selects does not affect the date for which calendar data is being displayed to Bob, and the date that Bob selects does not affect the calendar data that is being displayed to Adam. It is recognized, however, that in an alternate implementation, one user may control what one or more other users see. For example, if one user navigates to another day, the data being displayed to the other users may automatically switch to the other day as well.

Figure 8:
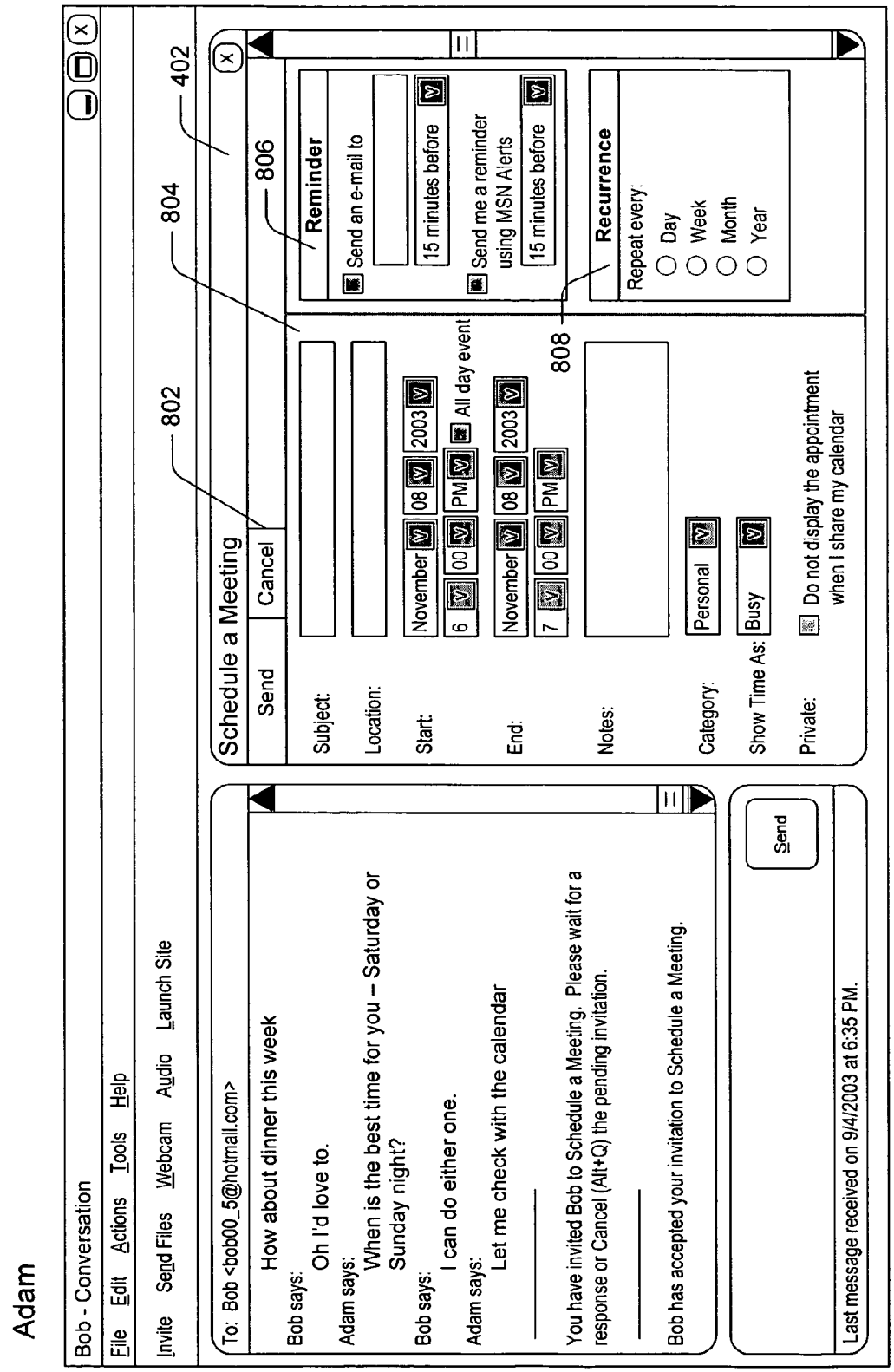
FIG. 8 is a pictorial diagram of an exemplary instant messaging user interface screen through which a user may schedule a new meeting.

FIG. 8 illustrates an exemplary screen display that may be rendered as a result of a user (e.g., Adam 102) selecting new meeting menu item 416. After selecting new meeting menu item 416, schedule a meeting area 402 includes a menu bar 802, a meeting definition area 804, a reminder area 806, and a recurrence area 808.

Menu bar 802 includes a send option and a cancel option. When a user selects the send option, an invitation to accept the new meeting is sent via the instant messaging session to the other individuals who are participating in the current instant messaging calendar sharing session. When a user selects the cancel option, the user's request to schedule a new meeting is cancelled.

Meeting definition area 804 includes tools that enable a user to define a subject, location, start date and time, and end date and time to be associated with a new meeting. Meeting definition area 804 may also include tools that enable a user to record additional notes about the meeting and specify a category for the meeting (e.g., personal or business). Furthermore, meeting definition area 804 may also include tools that enable a user to specify how the meeting is to appear to the user and to any other users with whom the user shares his calendar. For example, the show time as drop down list allows the user to select how the meeting time is to appear on the user's calendar. Options may include, for example, busy, out of the office, free, or tentative. Another example may be a private checkbox that, if checked, indicates that the meeting is not to appear to other users with whom the user's calendar may be shared.

Reminder area 806 includes tools that enable the user to indicate whether and how the user wants to be reminded of the meeting. For example, a user may choose to be reminded by email (at a specified email address) a particular period of time before the meeting is scheduled to begin. Additionally, a user may choose to be reminded via an online alerts system a specified period of time before the meeting is scheduled to begin.

Recurrence area 808 includes tools that enable a user to indicate a frequency with which a recurring meeting is to occur. Example frequencies may include, but are not limited to, daily, weekly, monthly, and yearly. Additional choices may also be available. For example, if the user selects monthly, additional choices may allow the user to specify that the meeting is to occur on a particular date every month (e.g., the 5$^{th}$ of every month), or a particular day every month (e.g., the second Tuesday of every month).

Once the user has defined the meeting, the user can select the send option in menu bar 802, to cause an invitation to the meeting to be sent to other participants of the current instant messaging calendar sharing session.

Figure 9:
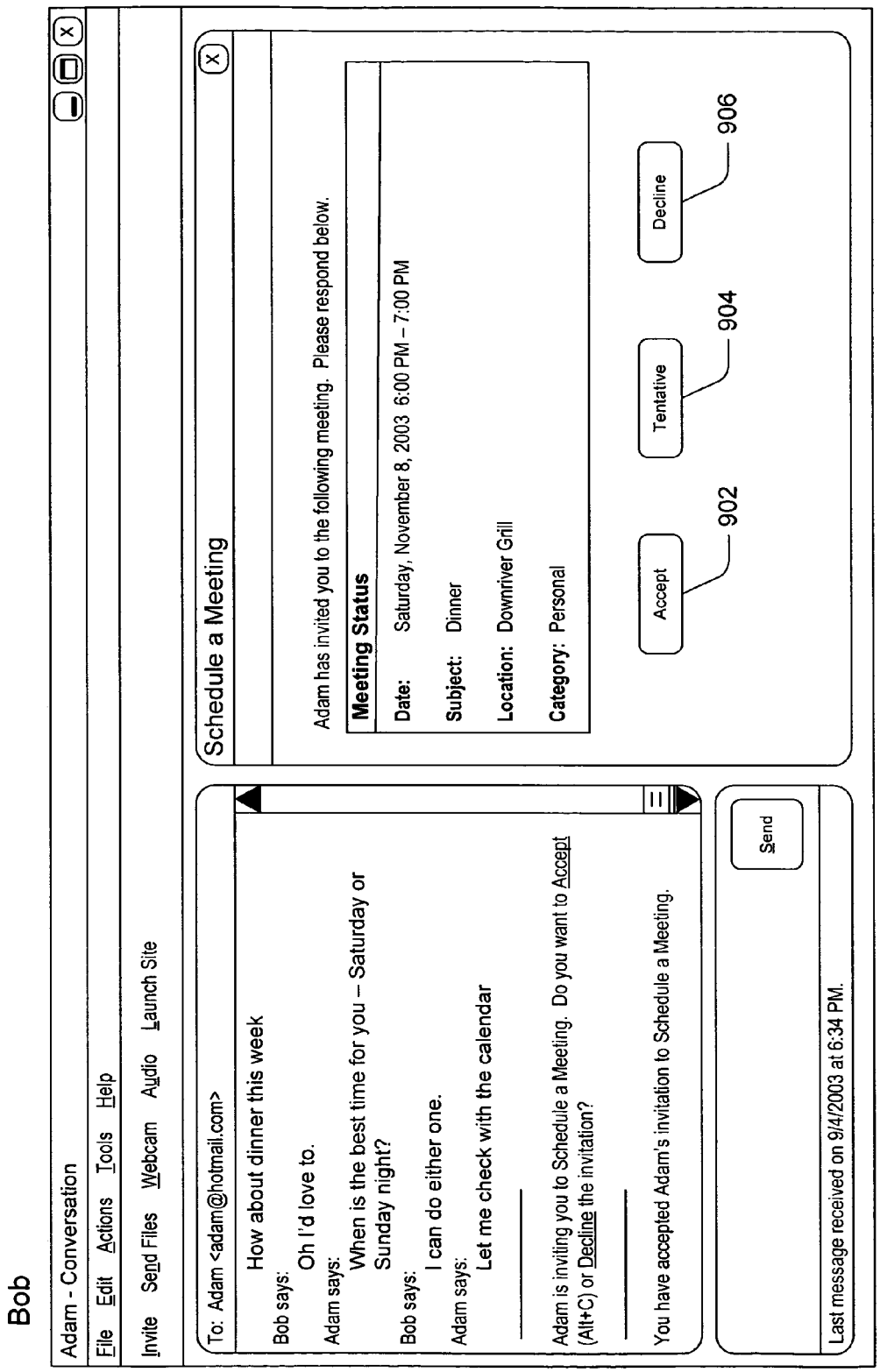
FIG. 9 is a pictorial diagram of an exemplary instant messaging user interface screen that may be used to display an invitation to accept or decline a scheduled meeting.

FIG. 9 illustrates an exemplary screen display illustrating a meeting invitation that may be received by a participant in the current instant messaging calendar sharing session. The meeting invitation includes data from the meeting definition as described above with reference to FIG. 8. The meeting invitation includes an accept button 902, a tentative button 904, and a decline button 906. If the user selects the decline button 906, the meeting is not scheduled. If the user selects either the accept button 902 or the tentative button 904, the meeting is scheduled in both user's calendars.

Figure 10:
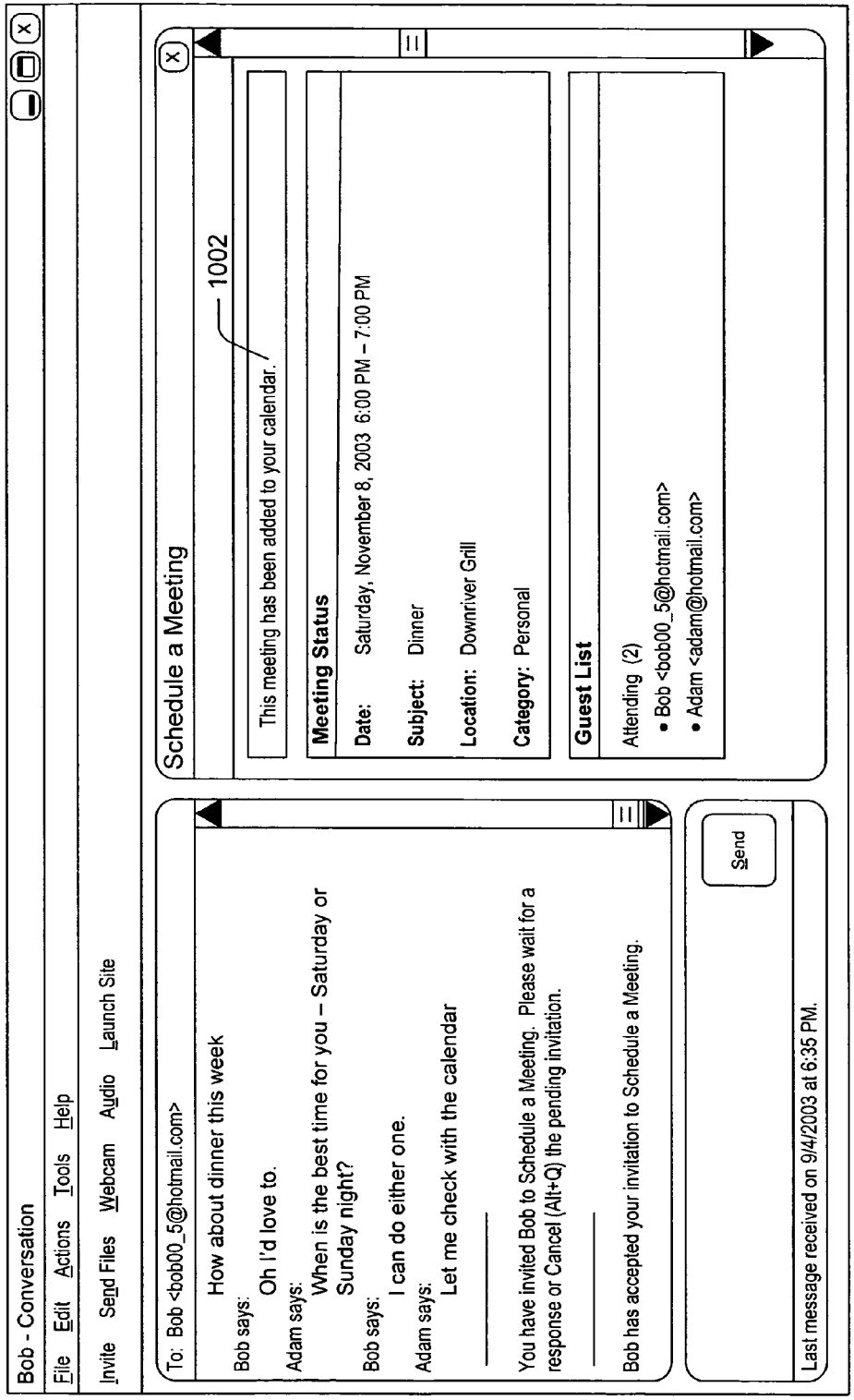
FIG. 10 is a pictorial diagram of an exemplary instant messaging user interface screen that may be displayed after a user accepts a meeting invitation.

FIG. 10 illustrates an exemplary meeting confirmation screen that may be displayed after a user accepts a meeting invitation. In an exemplary implementation, the meeting confirmation illustrated in FIG. 10 is displayed to both users. Meeting confirmation 1002 indicates that the meeting has been added to the user's calendar, displays the meeting details, and displays a list of users who are confirmed to attend the meeting. In an alternate implementation, the list of users confirmed to attend the meeting may be displayed only if there are more than two meeting attendees.

Figure 11:
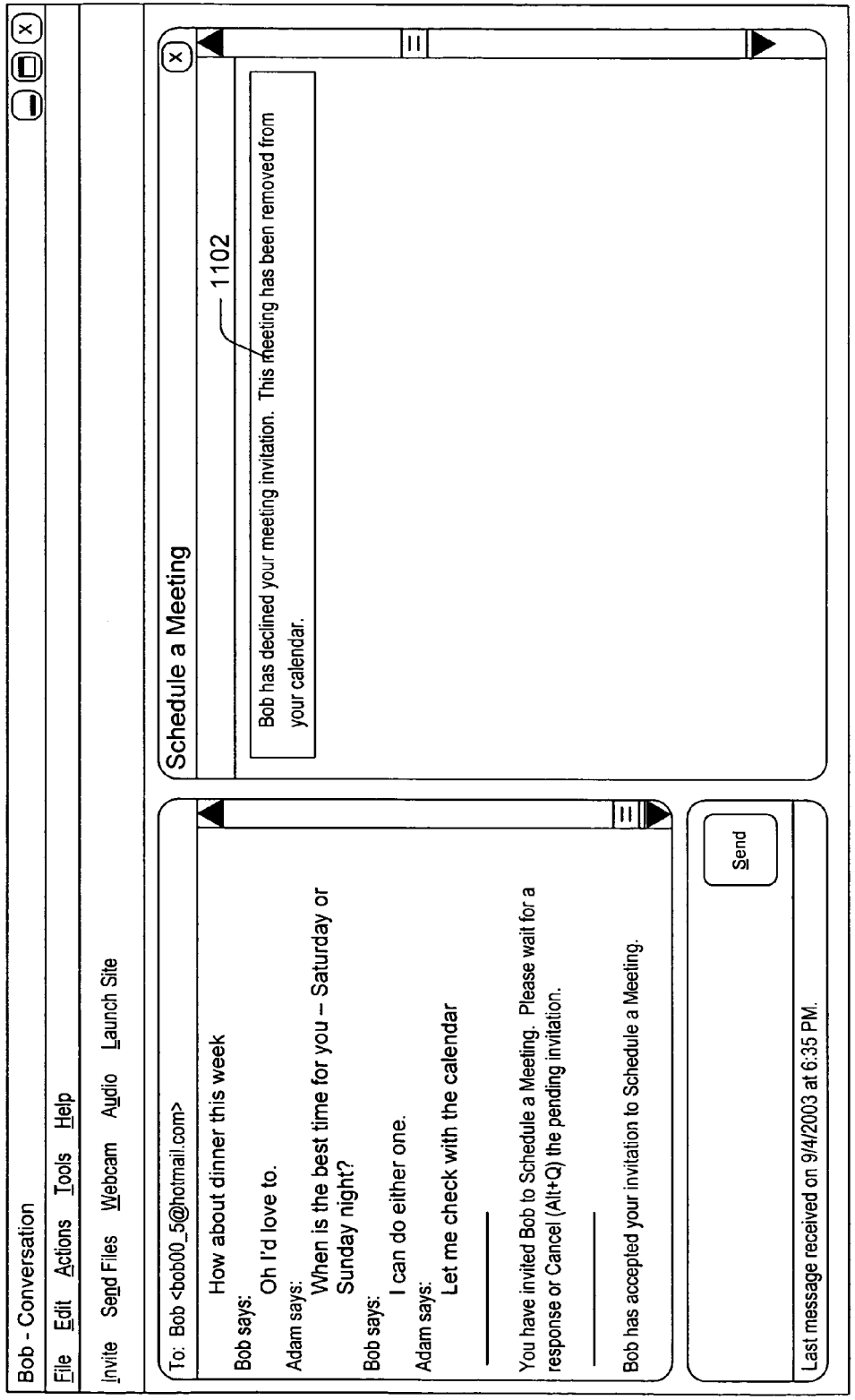
FIG. 11 is a pictorial diagram of an exemplary instant messaging user interface screen that may be displayed after a user declines a meeting invitation.

FIG. 11 illustrates an exemplary declined meeting notification screen 1100 that may be displayed after a user declines a meeting invitation. In an exemplary implementation, the declined meeting summary screen illustrated in FIG. 11 is displayed to the user who initially scheduled the meeting. Meeting summary 1102 indicates that the meeting has been removed from the user's calendar, displays the meeting details, and displays a list of users who were invited to attend the meeting, and an indicator of which user (or users) declined the invitation. In an alternate implementation, additional details associated with the meeting may also be displayed as part of declined meeting notification screen 1100. For example, details such as the date, time, subject, location, and category may be displayed. In addition, a guest list may be displayed. In an exemplary implementation, if multiple users are invited to a meeting, a guest list area may include data that indicates which users have accepted the invitation and which users have declined the invitation.

Exemplary Environment

Figure 12:
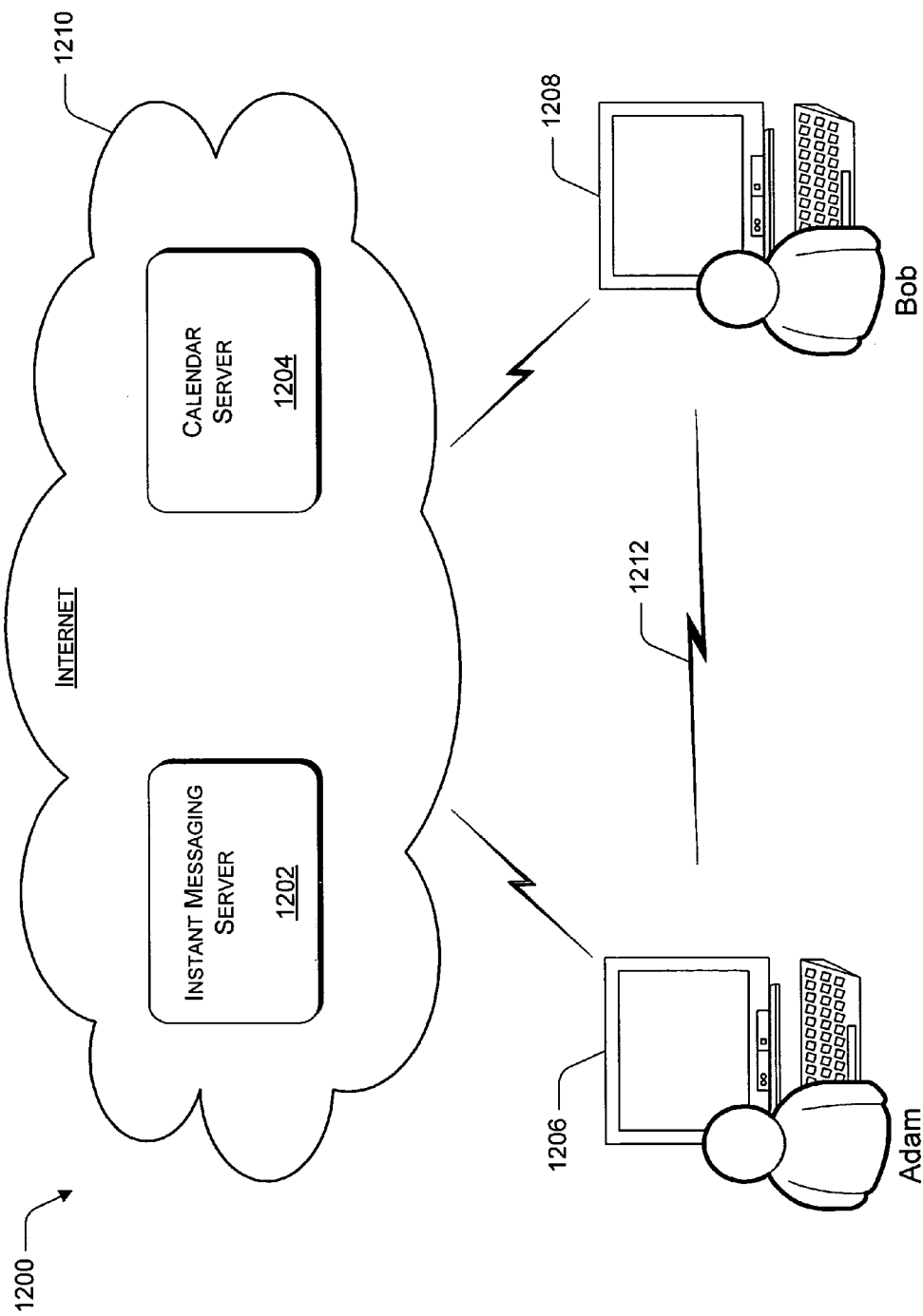
FIG. 12 is a pictorial diagram of an exemplary environment in which calendar sharing within an instant messaging session may be implemented.

FIG. 12 illustrates an exemplary environment 1200 in which calendar sharing within an instant messaging session may be implemented. The illustrated environment 1200 includes instant messaging server 1202 and calendar server 1204, both accessible through client devices 1206 and 1208 via a network, such as the Internet 1210. Instant messaging server 1202 facilitates the establishment of an instant messaging session between client devices 1206 and 1208. (As described above, an instant messaging session may be established between three or more client devices, but for purposes of this discussion, an example is described in which the instant messaging session includes only two users.) Establishment of an instant messaging session enables users of client devices 1206 and 1208 to communicate, typically via a peer-to-peer connection 1212. Once the instant messaging session is established, either user may initiate a request to begin a calendar sharing session within the established instant messaging session. Calendar sharing session requests are handled by calendar server 1204. Although illustrated and described with respect to calendar sharing, it is recognized that the techniques described herein may be applied to other types of data sharing as well, including, but not limited to, music sharing, shared document editing, and so on.

Establishing a Calendar Sharing Session

Figure 13:
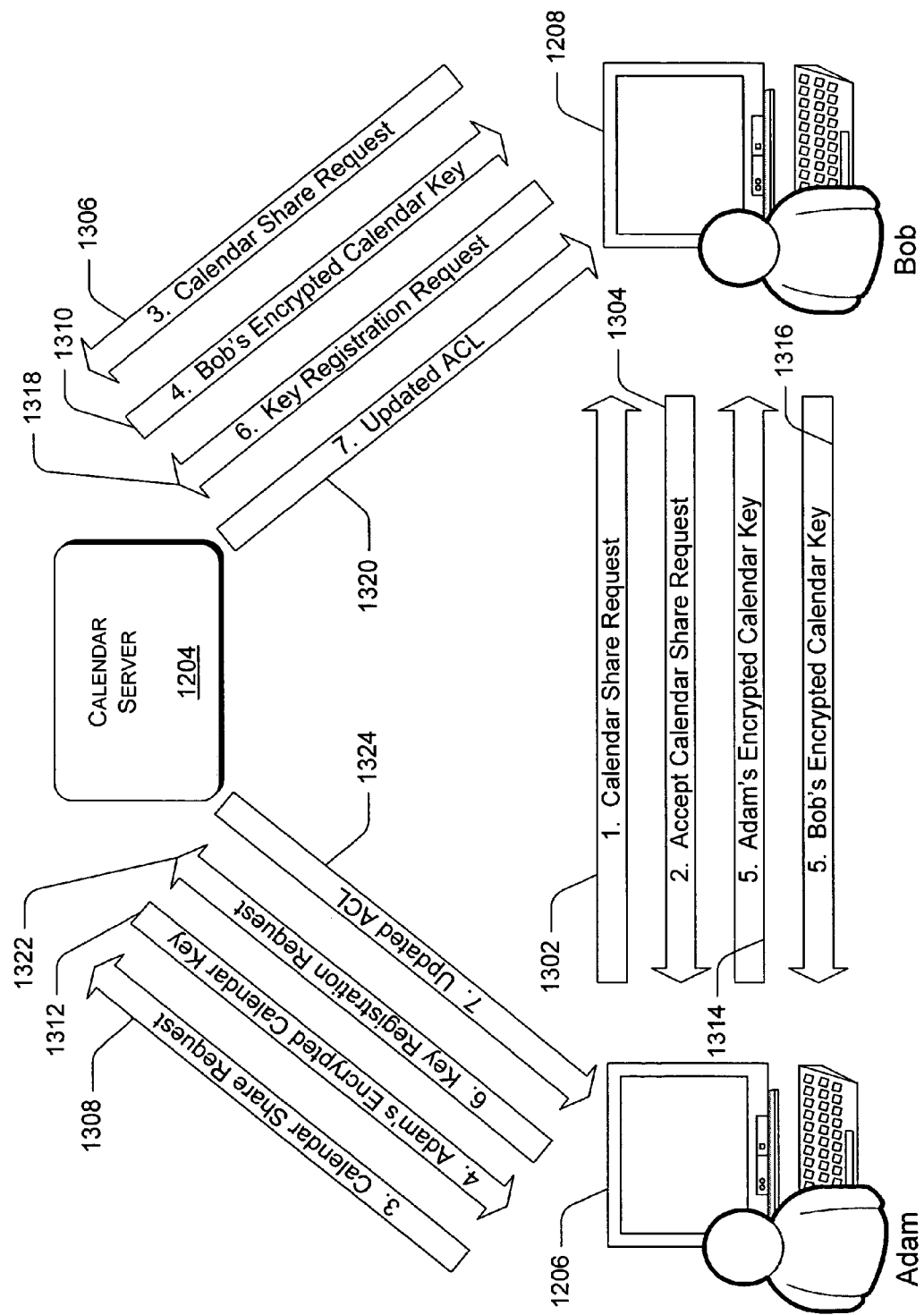
FIG. 13 is a pictorial diagram that illustrates an exemplary series of communications that may be performed to establish a calendar sharing session within an instant messaging session.

FIG. 13 illustrates an exemplary series of communications that may be performed in the establishment of a calendar sharing session within an instant messaging session. In the illustrated example, a user named Adam is using client device 1206 and a user named Bob is using client device 1208. Adam and Bob are communicating with each other via an established instant messaging session when Adam decides to initiate a calendar sharing session with Bob.

Adam causes a calendar sharing request to be sent from client device 1206 to client device 1208, as represented by arrow 1302. FIG. 2, described above, illustrates a menu item that may be selected by a user, causing the calendar sharing request to be generated. Arrow 1304 represents a communication that is sent from client device 1208 to client device 1206 when Bob accepts the invitation to begin a calendar sharing session. The calendar sharing invitation may be received and responded to through the instant messaging session as described above with reference to FIG. 3.

In the described implementation, Adam and Bob each have calendar data stored on calendar server 1204. In the described exemplary implementation, the calendar data is password protected to ensure that only authorized individuals can view and/or modify an individual's calendar. Accordingly, after an invitation to begin a calendar sharing session has been sent and accepted, instant messaging applications on client devices 1206 and 1208 each transmit a request to share each respective user's calendar data to calendar server 1204. For example, as represented by arrow 1306, client device 1208 sends a calendar sharing request to calendar server 1204. Similarly, as represented by arrow 1308, client device 1206 sends a calendar sharing request to calendar server 1204. Calendar server 1204 sends back to client device 1208, an encrypted key that can be used to access Bob's calendar data (represented by arrow 1310). Similarly, calendar server 1204 sends back to client device 1206, an encrypted key that can be used to access Adam's calendar data (represented by arrow 1312). The encrypted keys are then exchanged via the instant messaging session, as represented by arrows 1314 and 1316, thereby granting each user access to the other's calendar data. That is, Adam's key is transmitted to Bob, thereby granting Bob access to Adam's calendar information; and Bob's key is transmitted to Adam, thereby granting Adam access to Bob's calendar information. If three or more users are participating in the calendar sharing session, then data access keys may be exchanged among all of the participants. After the keys are exchanged, the keys are registered with calendar server 1204. For example, the instant messaging application on client 1208 sends a request 1318 to calendar server 1204. The request 1318 includes an access control list (ACL), which is a store of keys, along with the new key, which provides access to Adam's calendar. In an exemplary implementation, the ACL is stored and transmitted as a cookie, and the new key is transmitted as part of a URL. Calendar server 1204 updates the received ACL, removing any expired keys and adding the new key. Calendar server 1204 then returns an updated ACL cookie, represented by arrow 1320. A similar exchange occurs between client device 1206 and calendar server 1204, as illustrated by arrows 1322 and 1324. In the described exemplary implementation, the key registration is performed by calendar server 1204 because, for security reasons, the client is not trusted with the information necessary to decode and encode individual keys or sets of keys in the ACL cookie.

Although not illustrated in FIG. 13, in an exemplary implementation, Adam's display preferences may also be applied to the calendar data displayed on Bob's client. This may be important, for example, if Adam and Bob are in different time zones. In such an implementation, after Adam's client successfully register's Bob's key, a request for Adam's display preferences is transmitted from client device 1206 to calendar server 1204. When the display preferences are returned, they are then transmitted via the instant message session to client device 1208. Example display parameters may include, but are not limited to, language, time zone, week start day, start hour for the day view, and end hour for the day view.

Figure 14:
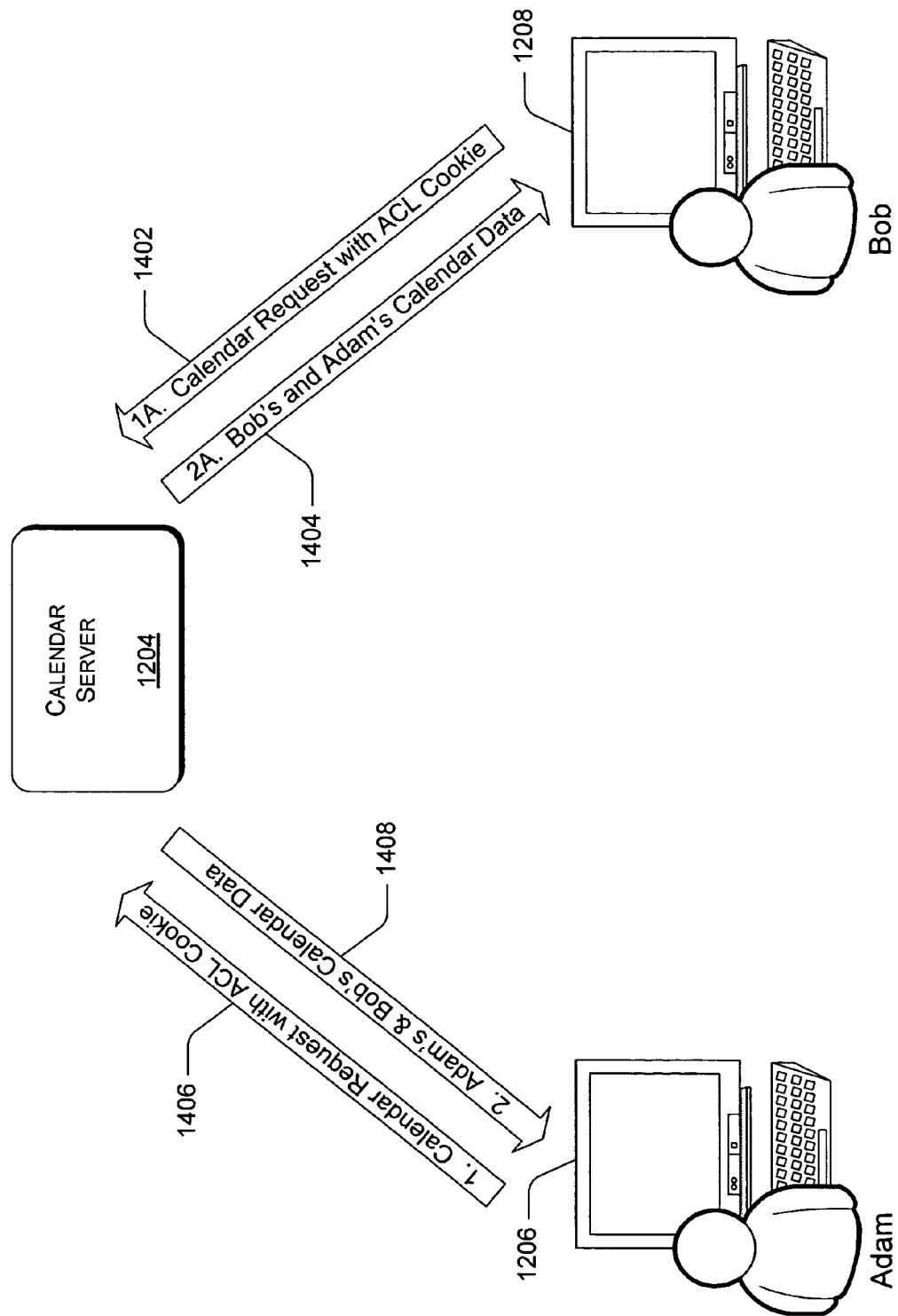
FIG. 14 is a pictorial diagram that illustrates an exemplary series of communications that may be performed to enable the display of shared calendar information within an instant messaging session.

FIG. 14 illustrates an exemplary series of communications that may be performed to enable the display of shared calendar information within an instant messaging session. After the exchange of encrypted keys, as described above with reference to FIG. 13, each client device requests calendar data. For example, as represented by arrow 1402, client device 1208 sends to calendar server 1204, a request for calendar information (the request including the ACL cookie stored on client device 1208). Calendar server 1204 verifies Bob's authentication credentials (e.g., username and password), and verifies that the received ACL includes a valid key to access Adam's calendar data. Calendar server 1204 responds to the request by returning both Bob's calendar data and Adam's calendar data to client 1208 (as represented by arrow 1404). Similarly, arrow 1406 represents a request for calendar information sent from client device 1206 to calendar server 1204, and arrow 1408 represents the transmission of calendar data for both Adam and Bob from calendar server 1204 to client device 1206. The received calendar data may then be displayed to the users, for example, as illustrated in FIGS. 4 and 5.

Scheduling a New Meeting

Figure 15:
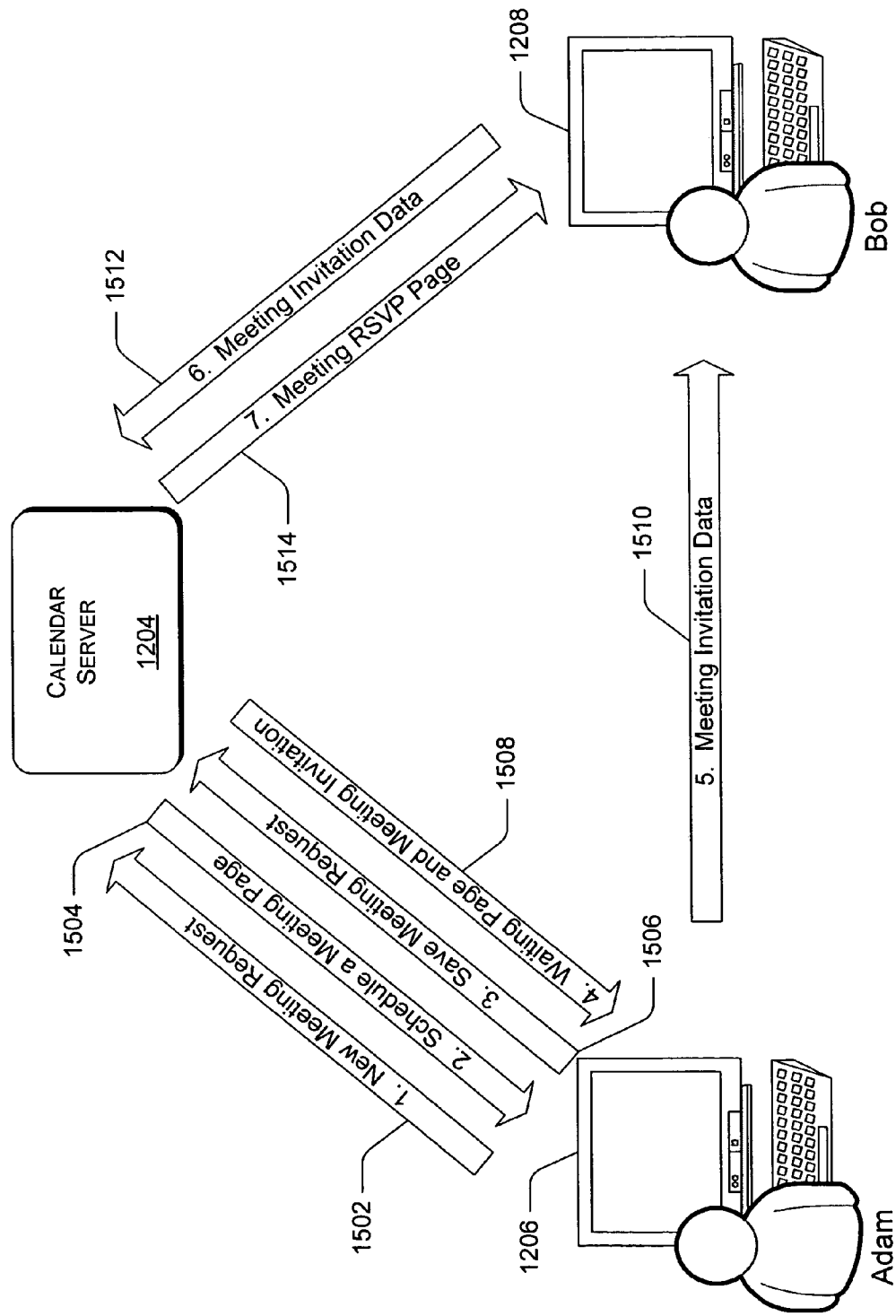
FIG. 15 is a pictorial diagram that illustrates an exemplary series of communications that may be performed to enable the scheduling of a new meeting to be attended by participants of an instant messaging session.

FIG. 15 illustrates an exemplary series of communications that may be performed to enable the scheduling of a new meeting to be attended by participants of an instant messaging session. As described above with reference to FIG. 4, a calendar sharing portion of an instant messaging user interface may provide a selectable option (e.g., new menu item 416) that causes a user interface to be displayed through which a new meeting may be defined (as illustrated in FIG. 8). When a user requests to schedule a new meeting (e.g., by selecting new menu item 416, as illustrated in FIG. 4), a new meeting request is sent from the client device (e.g., client device 1206) to calendar server 1204. Transmission of the new meeting request is represented in FIG. 15 with arrow 1502.

Arrow 1504 represents transmission of data from calendar server 1204 to client device 1206 that directs client device 1206 to display a user interface screen that enables a user to define a new meeting. An example of such a user interface screen is described above with reference to FIG. 8.

As described above with reference to FIG. 8, a calendar sharing portion of an instant messaging user interface may provide tools to enable a user to schedule a new meeting. After Adam defines the meeting details, the meeting details are transmitted from client device 1206 to calendar server 1204 (as represented by arrow 1506). The save meeting request data transmission includes the meeting details so the meeting can be added to the appropriate calendar data in calendar server 1204. Upon receipt of the save meeting request, calendar server 1204 sends back to client device 1206, data required to display a confirmation page that indicates that an invitation for the other user to accept the meeting has been sent. As indicated by arrow 1508, data for generating a meeting invitation is also sent back from calendar server 1204 to client device 1206.

A meeting invitation (represented by arrow 1510) is then transmitted from client device 1206 to client device 1208 via the previously established instant messaging session. When client device 1208 receives the meeting invitation data, the data is forwarded to calendar server 1204 (as represented by arrow 1512). Calendar server then uses the meeting invitation data to look up the meeting details, and, as represented by arrow 1514, transmits back to client device 1208, data to generate a meeting RSVP user interface screen. An example meeting RSVP user interface screen is described above with reference to FIG. 9. As described above with reference to FIG. 9, the invited user may choose to accept the invitation, tentatively accept the invitation, or decline the invitation. Communication exchanges associated with acceptance of a scheduled meeting are described below with reference to FIG. 16. Communication exchanges associated with declination of a scheduled meeting are described below with reference to FIG. 17.

Accepting a Scheduled Meeting

Figure 16:
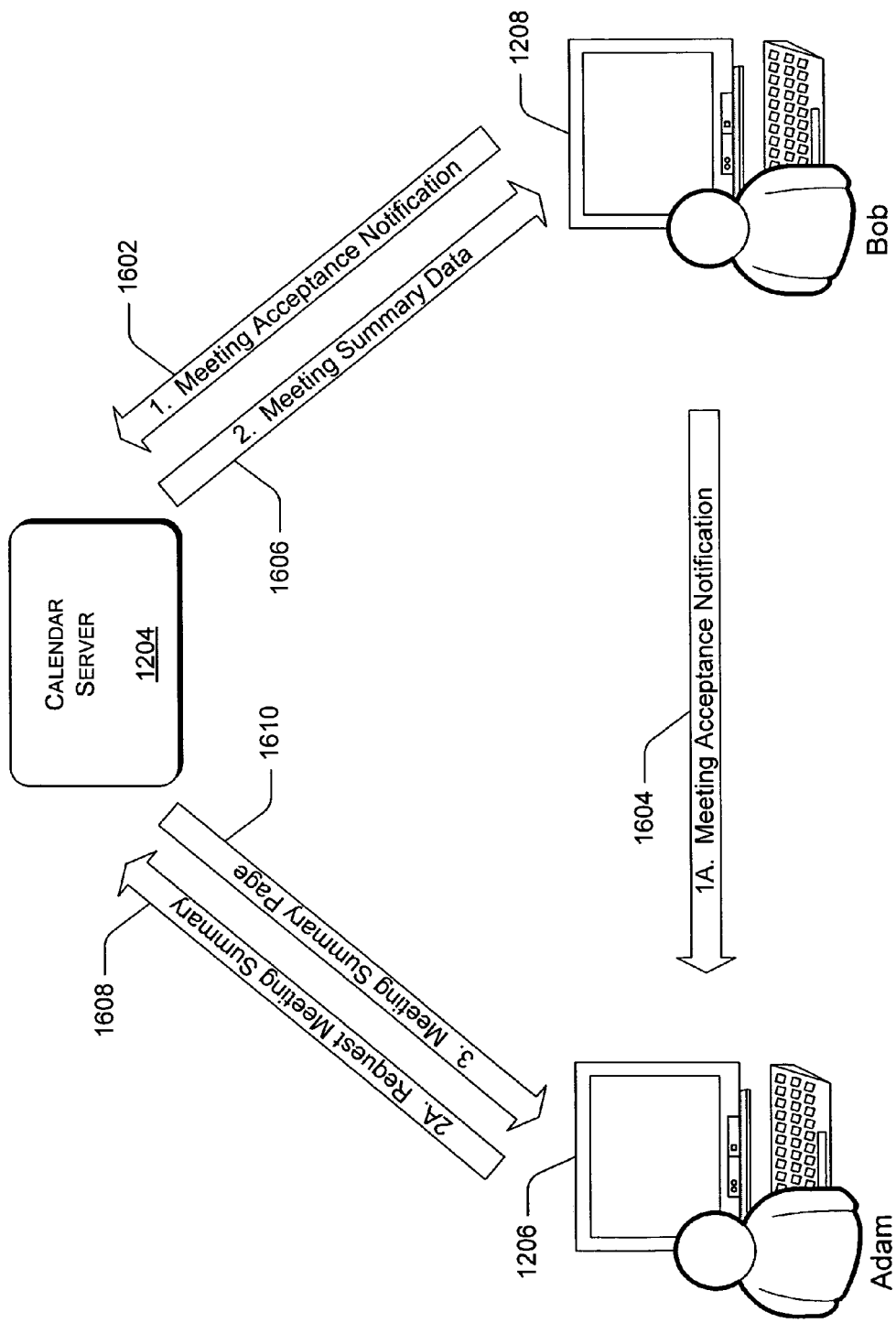
FIG. 16 is a pictorial diagram that illustrates an exemplary series of communications that may be performed in response to a user's acceptance of a meeting invitation.

As described above with reference to FIG. 9, an invitation to accept a scheduled meeting may be displayed via a user interface that includes selectable buttons that enable a user to accept, tentatively accept, or decline a scheduled meeting. FIG. 16 illustrates an exemplary series of communications that may be performed based on a user's acceptance of a meeting invitation.

In the illustrated example, Bob accepts a meeting that has been scheduled by Adam. For example, Bob may select the accept button 902 as described above with reference to FIG. 9. (A similar exchange is performed if a user selects the tentative button 904.) Selection of an accept button causes a meeting acceptance notification to be sent to calendar server 1204, as represented by arrow 1602. A similar meeting acceptance notification is also sent to the client device 1206 from which the meeting invitation was received, as represented by arrow 1604. The formats and contents of meeting acceptance notifications 1602 and 1604 may be similar or may be very different. For example, in an exemplary implementation, meeting acceptance notification 1602 is generated from a form post in a web page, while meeting acceptance notification 1604 may be a custom message format supported by an instant messaging session.

When calendar server 1204 receives the meeting acceptance notification, calendar server updates data associated with both users' calendars to indicate that the meeting has been scheduled and accepted. Calendar server 1204 then transmits meeting summary data to client device 1208, as represented by arrow 1606. The received meeting summary data may then be displayed, for example, as illustrated in FIG. 10.

When client device 1206 receives the meeting acceptance notification (represented by arrow 1604), client device 1206 transmits a request for a meeting summary (represented by arrow 1608) to calendar server 1204. In response to receiving the request for a meeting summary, calendar server 1204 transmits meeting summary data to client device 1206, as represented by arrow 1610. The received meeting summary data may then be displayed, for example, as illustrated in FIG. 10.

Declining a Scheduled Meeting

Figure 17:
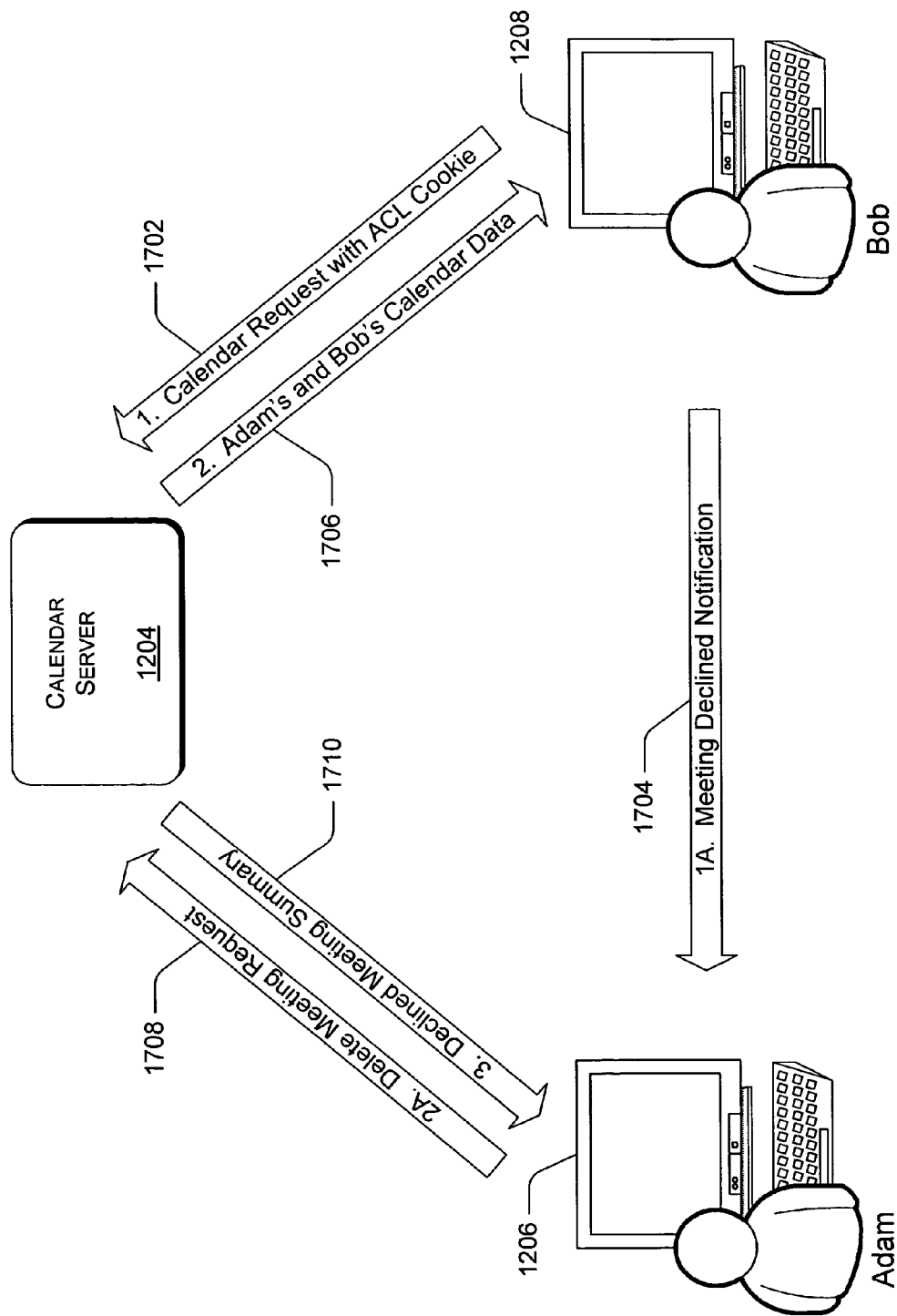
FIG. 17 is a pictorial diagram that illustrates an exemplary series of communications that may be performed in response to a user's declination of a meeting invitation.

FIG. 17 illustrates an exemplary series of communications that may be performed based on a user's declination of a meeting invitation. For example, when a user receives a meeting request, the user may respond by selecting a decline button, similar to decline button 906 illustrated in FIG. 9.

In the illustrated example, Bob declines a meeting that has been scheduled by Adam. For example, Bob may select the decline button 906 as described above with reference to FIG. 9. Selection of a decline button causes a request for calendar data to be sent to calendar server 1204, as represented by arrow 1702. Selection of the decline button also causes a meeting declination notification to be sent to the client device 1206 from which the meeting invitation was received, as represented by arrow 1704. When calendar server 1204 receives the request for calendar data 1702, calendar server transmits the requested data (e.g., calendar data associated with Adam's and Bob's calendars) to client device 1208, as represented by arrow 1706. The received calendar data may then be displayed, for example, as illustrated in FIG. 5.

When client device 1206 receives the meeting declination notification 1704, client device 1206 transmits a request to delete the meeting (represented by arrow 1708) to calendar server 1204. In response to receiving the request to delete the meeting, calendar server 1204 removes the meeting from Adam's and Bob's calendars, and transmits summary data associated with the declined meeting to client device 1206, as represented by arrow 1710. The received meeting summary data may then be displayed, for example, as illustrated in FIG. 11.

Client Device

Figure 18:
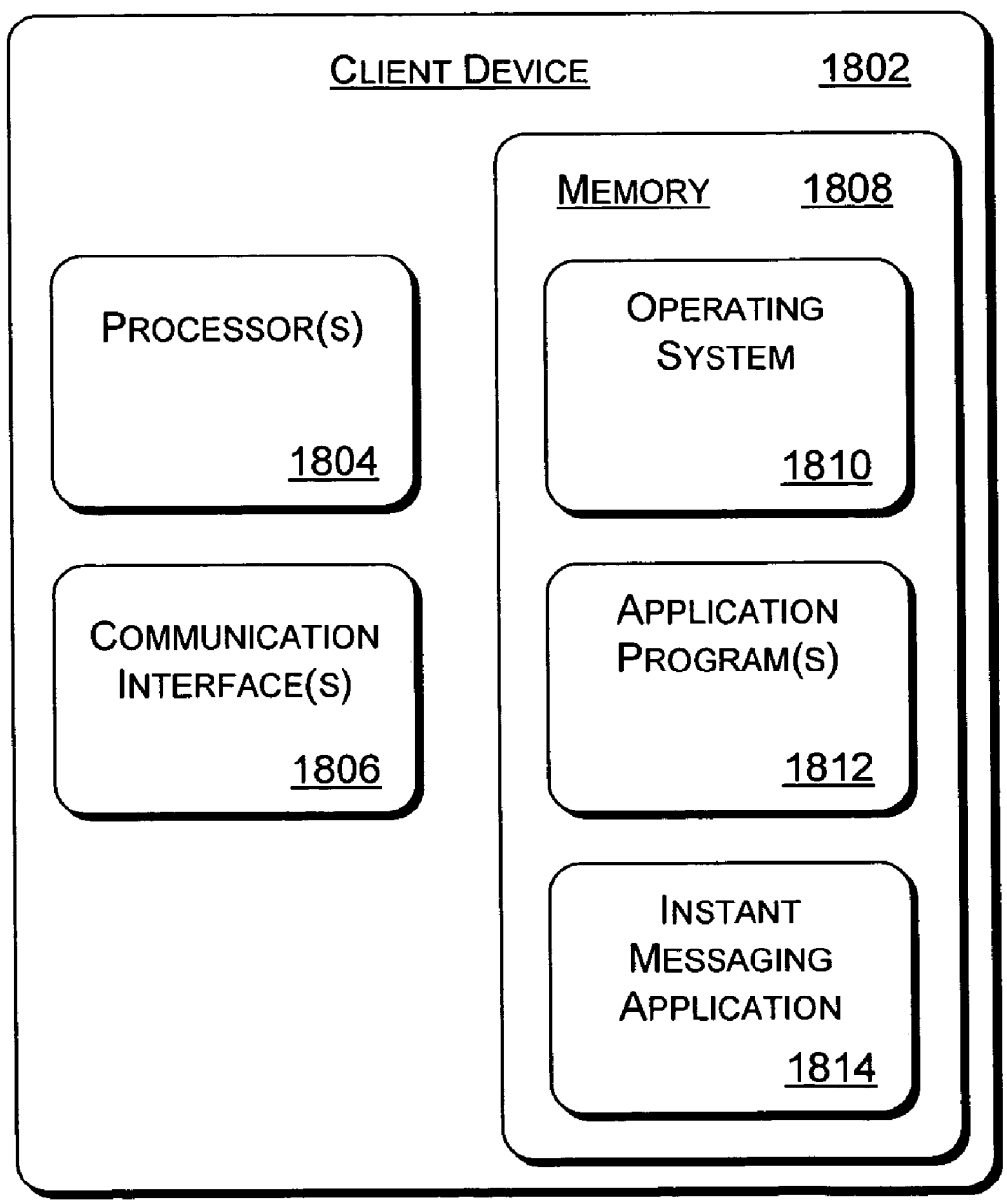
FIG. 18 is a block diagram that illustrates select components of an exemplary client device configured to support calendar sharing within an instant messaging session.

FIG. 18 illustrates select components of an exemplary client device 1802 that is configured to support calendar sharing within an instant messaging session. Client device 1802 may be implemented as any of a variety of computing devices, including, but not limited to, a personal computer, a mobile computing device, a cellular telephone, a personal digital assistant, or any other sort of computing device that can be configured to support an instant messaging application. Client device 1802 includes one or more processors 1804, one or more communication interfaces 1806, and a memory component 1808. Operating system 1810 and one or more application programs 1812 are stored in memory 1808 and executed on processor 1804. Instant messaging application 1814 is a specific application program that is stored in memory 1808 and executed on processor 1804.

Communication interface 1806 enables client device 1802 to communicate with other computing systems, such as instant messaging server 1202 and calendar server 1204. In an exemplary implementation, communication interface 1806 supports communication via an HTTP protocol.

Instant messaging application 1814 is configured to communicate (via communication interface 1806) with instant messaging server 1202 to establish an instant messaging session among two or more users. Instant messaging application 1814 is further configured to communicate with calendar server 1204 when a user, through an established instant messaging session, requests to participate in a calendar sharing session. In an exemplary implementation, instant messaging application 1814 includes or utilizes an HTTP client that is capable of receiving, storing, and sending cookies. Instant messaging application 1814 provides a user interface that enables a user to send and receive instant messaging communications. Instant messaging application 1814 also provides a user interface that enables a user to participate in a calendar sharing session within an established instant messaging session.

Calendar Server

Figure 19:
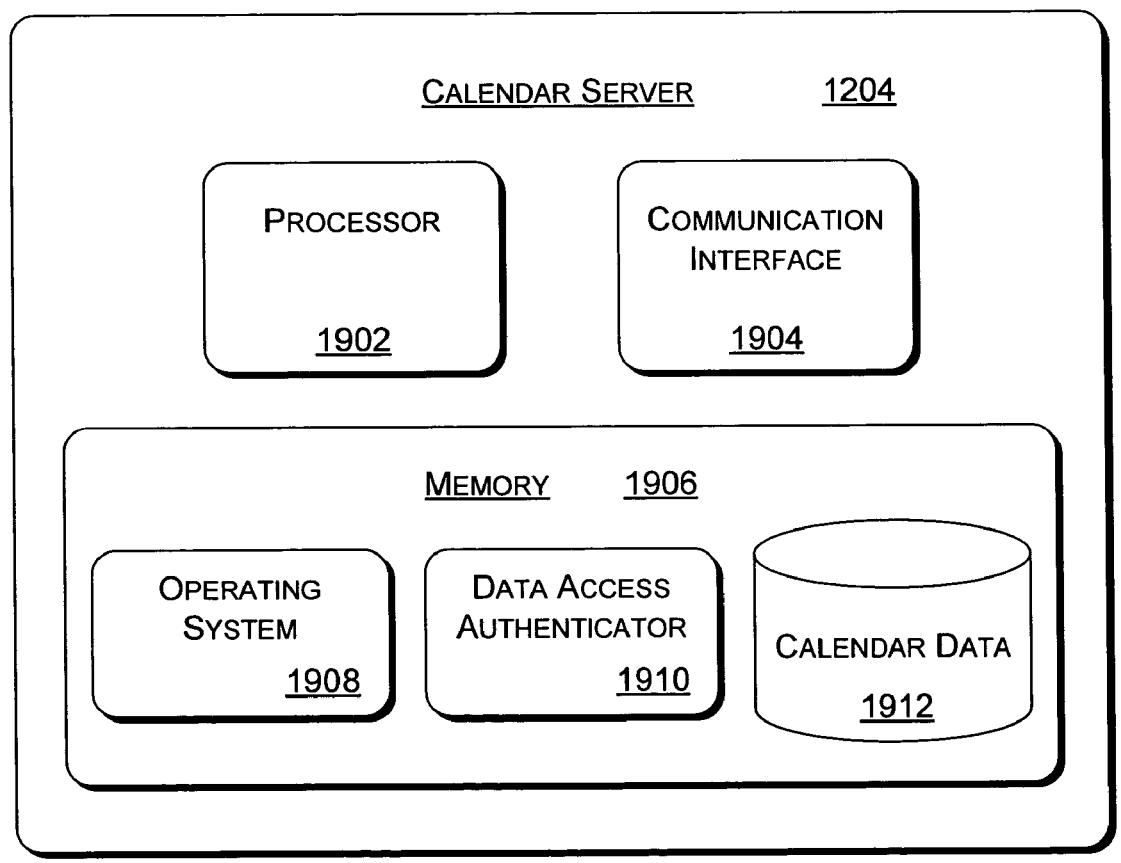
FIG. 19 is a block diagram that illustrates select components of an exemplary calendar server configured to support calendar sharing within an instant messaging session.

FIG. 19 illustrates select components of an exemplary calendar server 1204 that is configured to support calendar sharing within an instant messaging session. Calendar server 1204 includes processor 1902, communication interface 1904, and a memory component 1906. Operating system 1908 and data access authenticator 1910 are stored in memory 1906 and executed on processor 1902. Although illustrated as a single server, it is recognized that the components of calendar server 1204 may be distributed among one or more physical systems. For example, calendar data 1912 may be distributed across several server systems that, taken together, form a calendar data warehouse system.

Communication interface 1904 enables calendar server 1204 to communicate with other computing devices, such as client device 1802.

Calendar data repository 1912 is stored in memory 1906 and maintains calendar data for users of calendar server 1204. For example, a calendar data service supported by calendar server 1204 may be offered as a subscription service.

Data access authenticator 1910 verifies that users requesting access to calendar data stored in calendar data repository 1912 are authorized to access the data they are requesting. In an exemplary implementation, data access authenticator 1910 authenticates a user via a user and password, or some other technique. Once a user is authenticated, the user can access their own calendar data and/or request encrypted keys to share their calendar data with others. Upon request, data access authenticator 1910 generates encrypted keys for authenticated users of calendar server 1204. The encrypted keys can then be shared with other users. The encrypted keys can then be included in any user request to access data stored in calendar data repository 1912. When a user request is received to access another user's data in calendar data repository 1912, data access authenticator 1910 verifies that the request includes a valid key before granting the user access to the requested data.

In an exemplary implementation, data access authenticator 1910 generates an encrypted key when a user submits a calendar share request. The encrypted key may be set to expire after a specific period of time, such as 30 minutes. Additionally, the encrypted key may be associated with the current instant messaging session, so that when a user leaves the instant messaging session, any keys to other user's calendars that the user obtained while in the instant messaging session become invalid.

Data access authenticator 1910 may be configured to direct a client instant messaging application to automatically request a new key if a key expires while the user is still participating in the instant messaging session. Similarly, data access authenticator 1910 may be configured to direct a client instant messaging application to automatically request a new key if user-configured permissions are changed. For example, if a user has distributed keys to other users and then changes permissions such that other users can see full details of the user's calendar, rather than indicators of whether the user is free or busy, new keys may be automatically requested and re-distributed.

In an exemplary implementation, keys are stored in a cookie that is maintained on the client devices. When an instant messaging application requests data from calendar server 1204, the cookie is sent with the request. Data access authenticator 1910 may be configured to add keys to a user's cookie, thereby granting the user access to additional data. Additionally, data access authenticator 1910 may be configured to remove expired keys from a user's cookie.

Calendar Sharing Method

Figure 20:
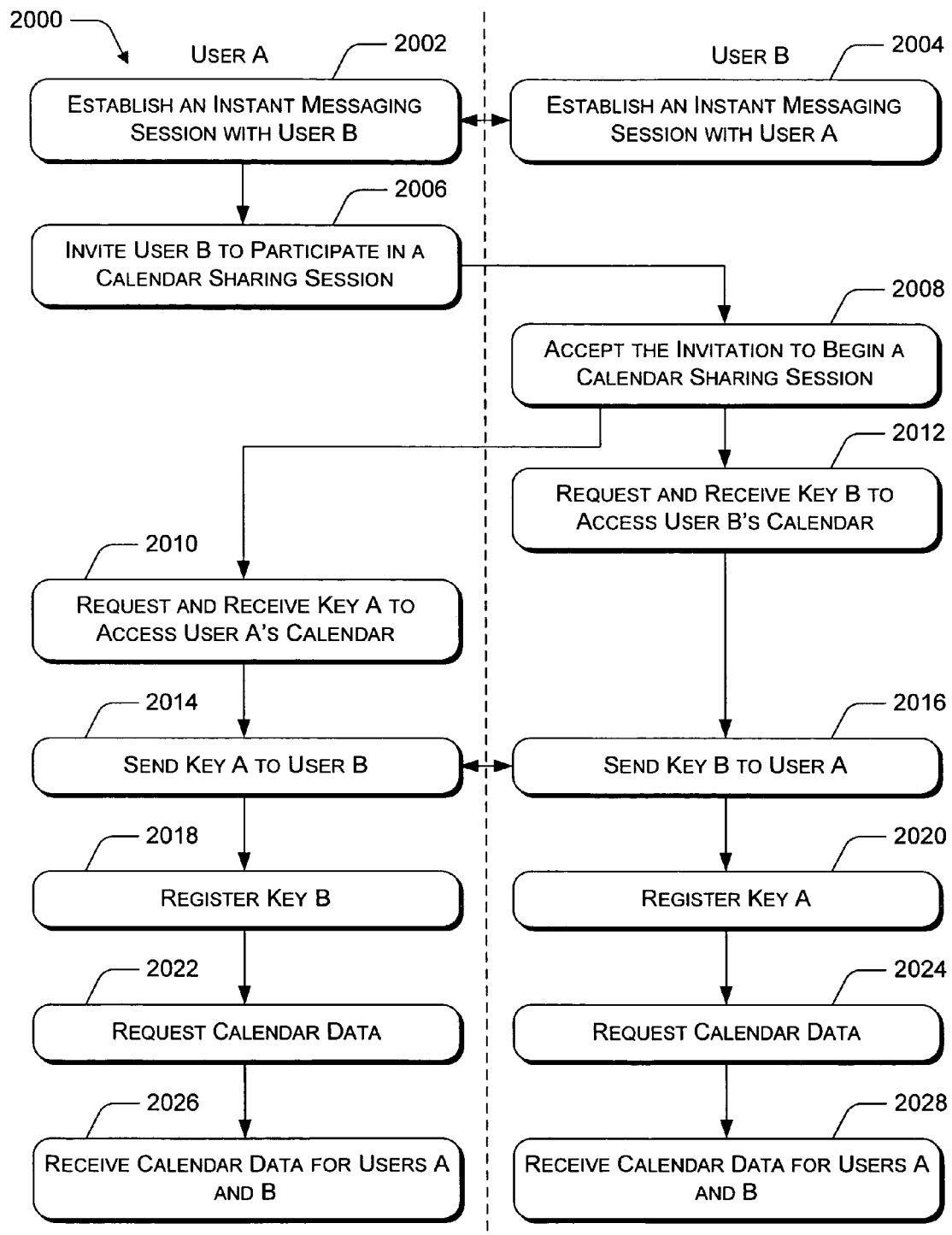
FIG. 20 is a flow diagram of an exemplary method for sharing calendar data within an instant messaging session.

FIG. 20 is a flow diagram that illustrates an exemplary method 2000 for sharing calendar data within an instant messaging session. The illustrated method can be implemented in any suitable hardware, software, firmware or combination thereof.

FIG. 20 is divided in two, with the left side of the figure illustrating processing that is performed in association with a first user, "User A", and the right side of the figure illustrating processing that is performed in association with a second user, "User B".

At blocks 2002 and 2004, an instant messaging session is established between User A and User B. For example, User A may initiate an instant messaging session with User B through an instant messaging client that is installed on User A's computer system. Alternatively, User B may initiate the instant messaging session. Techniques for establishing an instant messaging session are well-known to those skilled in the art.

At block 2006, User A invites User B to participate in a calendar sharing session. For example, as described above with reference to FIGS. 2 and 3, User A may select a calendar sharing menu item from within a user interface associated with the instant messaging session that was established as described above with reference to blocks 2002 and 2004. As illustrated by arrow 1302 in FIG. 13, a calendar share request is transmitted through the instant messaging session from a client device associated with User A to a client device associated with User B.

At block 2008, User B accepts the invitation to participate in a calendar sharing session. For example, as described with reference to FIG. 3, User B may select an accept link within the instant messaging user interface to indicate User B's acceptance of the invitation to begin a calendar sharing session. As indicated by arrow 1304 in FIG. 13, an indication of User B's acceptance is transmitted to User A's client device through the instant messaging session.

At block 2010, User A's client device requests and receives a key that can be used to access User A's calendar data. For example, as represented by arrow 1308 in FIG. 13, a calendar share request is transmitted from User A's client device to a calendar server. As represented by arrow 1312 in FIG. 13, in response to the request, the calendar server returns a key, which may be encrypted. The key that is returned provides access to User A's calendar data.

Similarly, at block 2012, User B's client device requests a key that can be used to access User B's calendar data. For example, as represented by arrow 1306 in FIG. 13, a calendar share request is transmitted from User B's client device to the calendar server. As represented by arrow 1310 in FIG. 13, in response to the request, the calendar server returns a key, which may be encrypted. The key that is returned provides access to User B's calendar data.

At blocks 2014 and 2016, the keys are exchanged. That is, at block 2014, User A's key is sent through the instant messaging session to User B. Similarly, at block 2016, User B's key is sent through the instant messaging session to User A.

At blocks 2018 and 2020, the exchanged keys are registered. For example, as described above with reference to FIG. 13, User B's key is sent with a registration request to the calendar server. The calendar server verifies that User B's key is valid, and then adds the key to User A's access control list, which may be stored, for example, as a cookie. Similar processing is performed on behalf of User B to register User A's key in User B's ACL.

In an exemplary implementation, display preferences associated with the initiating user (e.g., User A) may be applied to data displayed to User B. In such an implementation, although not illustrated in FIG. 20, after User B's key is registered in User A's ACL, a request for User A's display preferences is transmitted to the calendar server on behalf of User A. When the display preferences are received, they are then transmitted via the instant messaging session from User A to User B. Display preferences may include, but are not limited to, language, time zone, week start day, and start and end hours for day view.

At blocks 2022 and 2024, User A's client device and User B's client device each request calendar data from the calendar server. Such requests are illustrated in FIG. 14. For example, User A's request is represented by arrow 1406, and User B's request is represented by arrow 1402.

At blocks 2026 and 2028, calendar data is returned from the calendar server in response to the requests. An example of this data transmission is illustrated in FIG. 14. For example, User A's receipt of calendar data is represented by arrow 1408, and User B's receipt of calendar data is represented by arrow 1404.

Method for Accepting a Scheduled Meeting

Figure 21:
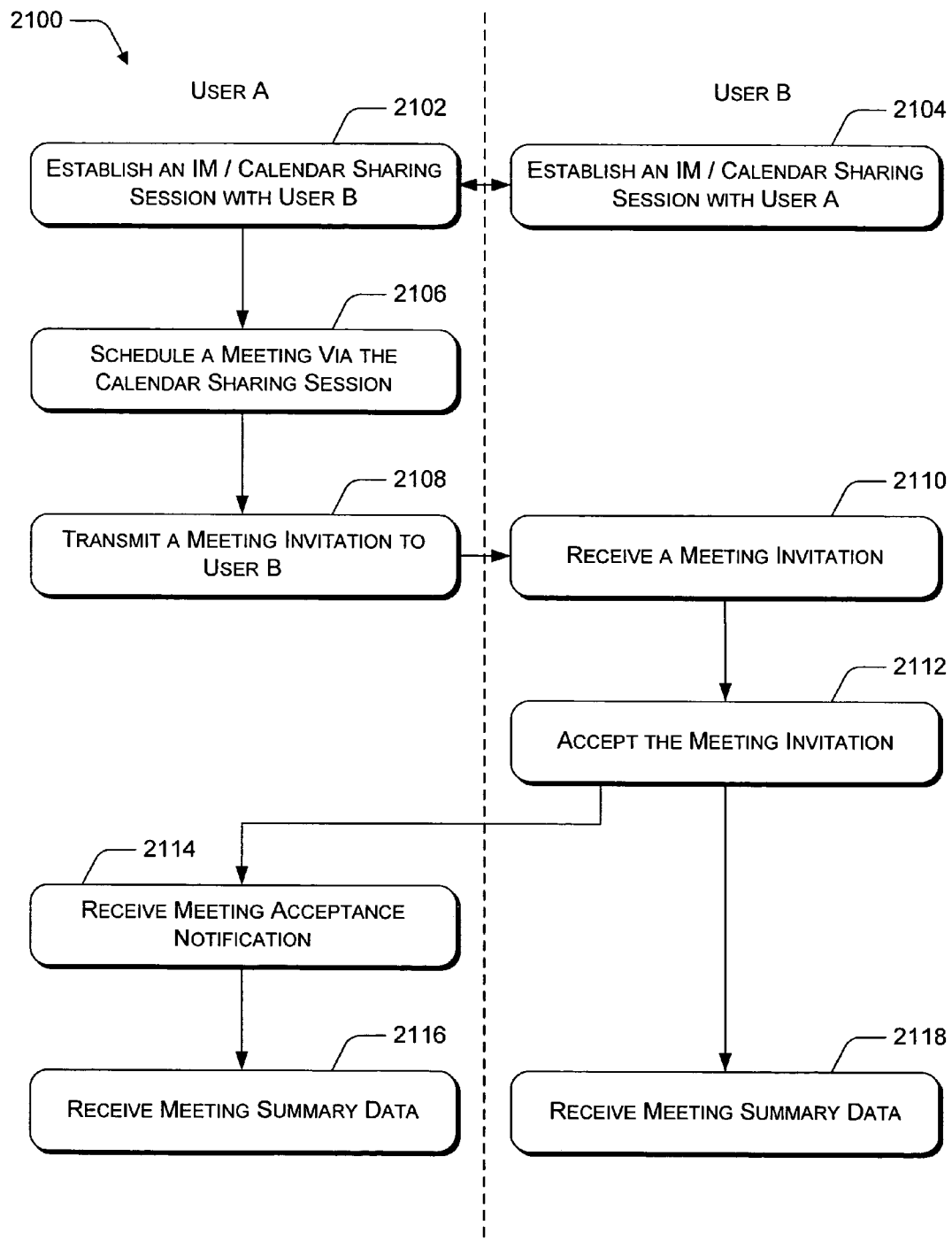
FIG. 21 is a flow diagram of an exemplary method for scheduling and accepting a meeting within an instant messaging session.

FIG. 21 is a flow diagram that illustrates an exemplary method 2100 for accepting a meeting that is scheduled within an instant messaging session. The illustrated method can be implemented in any suitable hardware, software, firmware or combination thereof.

FIG. 21 is divided in two, with the left side of the figure illustrating processing that is performed in association with a first user, "User A", and the right side of the figure illustrating processing that is performed in association with a second user, "User B".

At blocks 2102 and 2104, an instant messaging calendar sharing session is established between User A and User B. For example, an instant messaging calendar sharing session may be established as described above with reference to FIG. 20. Either user may initiate the calendar sharing session.

At block 2106, User A schedules a meeting via the calendar sharing session. For example, as described above with reference to FIG. 8, User A may schedule a meeting by entering a start date and time and an end date and time for the meeting to be scheduled. When User A schedules the meeting (e.g., by selecting the send button as illustrated in FIG. 8), a meeting request is sent to calendar server 1204, as described above with reference to arrow 1506 illustrated in FIG. 15.

At block 2108, User A's client device uses the established instant messaging session to transmit an invitation to attend the meeting to User B. For example, when User A selects a Send button (as described above with reference to FIG. 8), a meeting invitation is transmitted via the instant messaging session to User B. This data transmission is described above with reference to arrow 1510, illustrated in FIG. 15.

At block 2110, User B receives the meeting invitation via the instant messaging session, as illustrated by arrow 1510 in FIG. 15 The meeting invitation data is then transmitted to the calendar server 1204 (arrow 1512), and data for displaying a meeting RSVP page is returned (arrow 1514). An exemplary user interface through which the meeting RSVP details may be displayed is described above with reference to FIG. 9.

At block 2112, User B accepts the meeting invitation. For example, as described above with reference to FIG. 9, User B may select an accept button 902 to indicate that the meeting is to be added to User B's calendar data.

At block 2114, User A receives notification that User B has accepted the scheduled meeting. For example, as illustrated in FIG. 16, a meeting acceptance notification is transmitted from User B's client device to User A's client device (arrow 1604).

At blocks 2116 and 2118, User A and User B each receive summary data associated with the scheduled meeting. For example, as illustrated in FIG. 16, when User B accepts a meeting invitation, a meeting acceptance notification 1602 is sent to calendar server 1204. In response, meeting summary data is returned from calendar server 1204 (arrow 1606). Similarly, when User A receives notification that User B has accepted the meeting invitation (arrow 1604), a request for a meeting summary is sent to calendar server 1204 (arrow 1608). Calendar server 1204 then sends back meeting summary data (arrow 1610). The meeting summary data is displayed to both users, for example, as illustrated in FIG. 10.

Method for Declining a Scheduled Meeting

Figure 22:
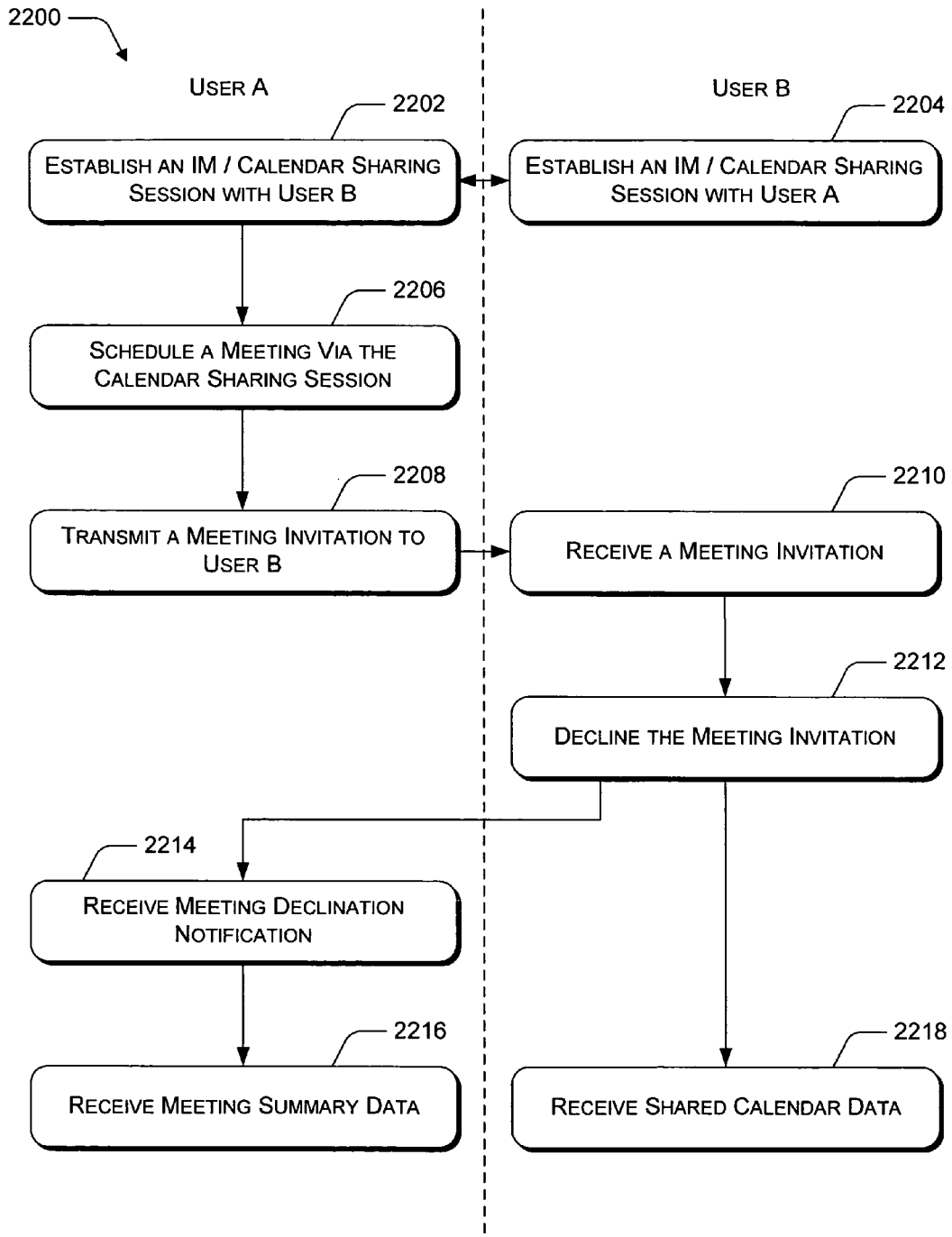
FIG. 22 is a flow diagram of an exemplary method for scheduling and declining a meeting within an instant messaging session.

FIG. 22 is a flow diagram that illustrates an exemplary method 2200 for declining a meeting that is scheduled within an instant messaging session. The illustrated method can be implemented in any suitable hardware, software, firmware or combination thereof.

FIG. 22 is divided in two, with the left side of the figure illustrating processing that is performed in association with a first user, "User A", and the right side of the figure illustrating processing that is performed in association with a second user, "User B".

At blocks 2202 and 2204, an instant messaging calendar sharing session is established between User A and User B. For example, an instant messaging calendar sharing session may be established as described above with reference to FIG. 20. Either user may initiate the calendar sharing session.

At block 2206, User A schedules a meeting via the calendar sharing session. For example, as described above with reference to FIG. 8, User A may schedule a meeting by entering a start date and time and an end date and time for the meeting to be scheduled. When User A schedules the meeting (e.g., by selecting the send button as illustrated in FIG. 8), a meeting request is sent to calendar server 1204, as described above with reference to arrow 1506 illustrated in FIG. 15.

At block 2208, the established instant messaging session is used to transmit an invitation to attend the meeting to User B. For example, when User A selects a Send button (as described above with reference to FIG. 8), a meeting invitation is transmitted via the instant messaging session to User B. This data transmission is described above with reference to arrow 1510, illustrated in FIG. 15.

At block 2210, User B receives the meeting invitation via the instant messaging session, as illustrated with arrow 1510 in FIG. 15. The meeting invitation data is then transmitted to the calendar server 1204 (arrow 1512), and data for displaying a meeting RSVP page is returned (arrow 1514). An exemplary user interface through which the meeting RSVP details may be displayed is described above with reference to FIG. 9.

At block 2212, User B declines the meeting invitation. For example, as described above with reference to FIG. 9, User B may select a decline button 902 to indicate that the meeting is not to be added to User B's calendar data.

At block 2214, User A receives notification that User B has declined the scheduled meeting. For example, as illustrated in FIG. 17, a meeting declination notification is transmitted from User B's client device to User A's client device (arrow 1704).

At block 2216, User A receives summary data associated with the declined meeting. For example, as illustrated in FIG. 17, when User A receives notification that User B has declined the meeting invitation (arrow 1704), a delete meeting request is sent to calendar server 1204 (arrow 1708). Calendar server 1204 then removes the meeting from User A's calendar data, and sends back meeting summary data (arrow 1710). The meeting summary data is displayed User A, for example, as illustrated in FIG. 11.

At block 2218, User B receives shared calendar data. For example, as illustrated in FIG. 17, when User B declines a meeting invitation, a request for calendar data 1702 is sent to calendar server 1204. In response, shared calendar data is sent back from calendar server 1204 to User B (arrow 1706).

Method for Providing Authenticated Access to User Data

Figure 23:
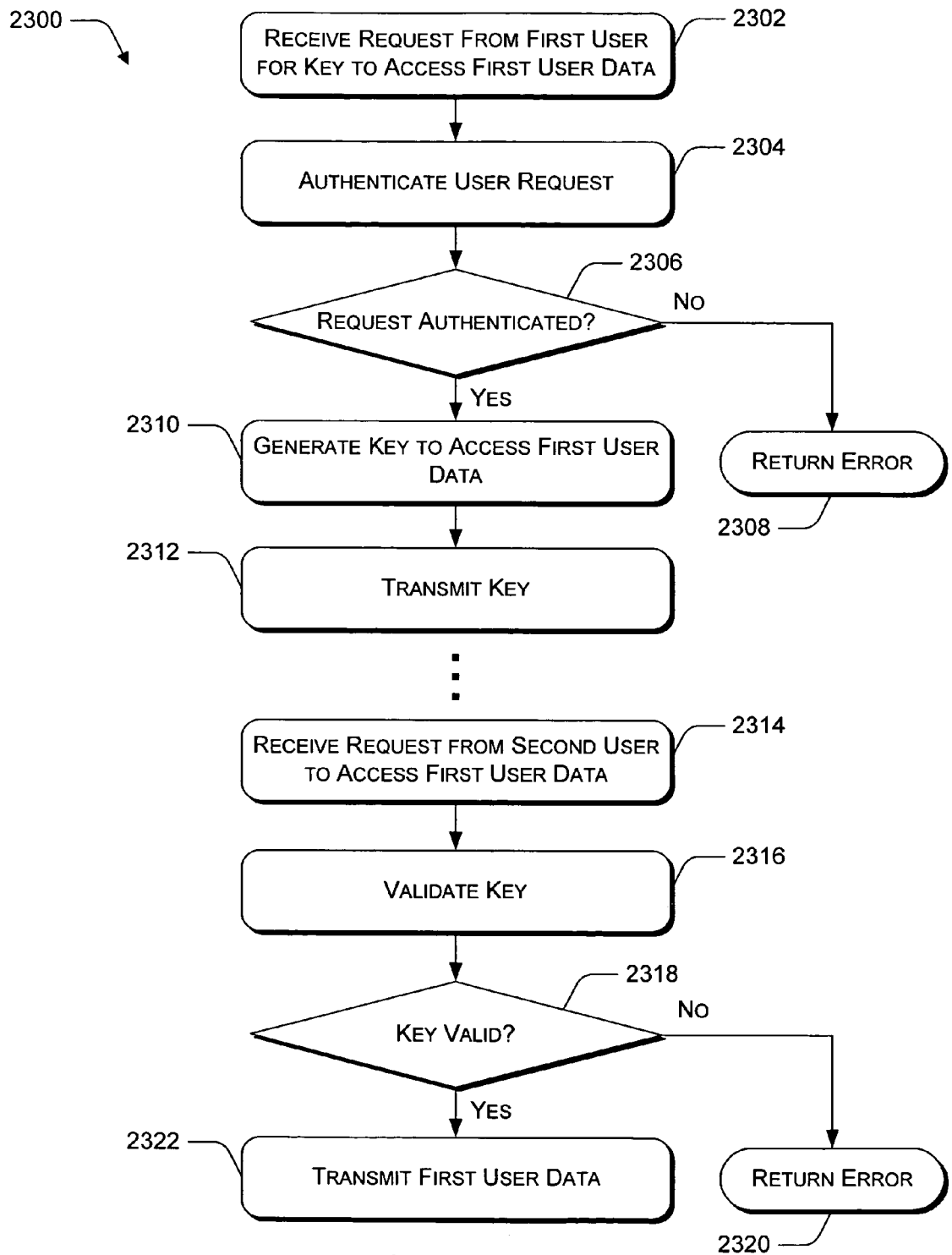
FIG. 23 is a flow diagram of an exemplary method for providing authenticated access to user data.

FIG. 23 is a flow diagram that illustrates an exemplary method 2300 for providing authenticated access to user data. The illustrated method can be implemented in any suitable hardware, software, firmware or combination thereof.

At block 2302, a calendar server receives a request on behalf of a first user for a key to access data associated with the first user. For example, as described above with respect to FIG. 13, a user (e.g., Adam) may submit through an instant messaging application, a request for a key to access Adam's calendar data.

At block 2304, calendar server 1204 authenticates the received request. For example, a user name and password may be required to verify that the user requesting the key is the user who is associated with the data that can be accessed with the key. It is recognized that any type of user authentication may be used to verify the identify of the user for whom the request is being submitted.

At block 2306, calendar server 1204 determines whether or not the request has been authenticated. If the request is not authenticated (the "No" branch from block 2306), then at block 2308, calendar server 1204 returns an error.

On the other hand, if the request is authenticated (the "Yes" branch from block 2306), then at block 2310, calendar server 1204 generates a key that enables access to data associated with the authenticated user. For example, as illustrated in FIG. 13, when Adam requests a key, a key to access Adam's calendar data is generated.

At block 2312, calendar server 1204 transmits the generated key to the requesting application. For example, if the request is received from an instant messaging application, the generated key is transmitted back to the instant messaging application.

After some period of time, at block 2314, calendar server 1204 receives a request for data from a second user. The request includes the key that was generated to enable access to the first user's data.

At block 2316, calendar server 1204 validates the key. For example, calendar server 1204 may verify that an expiration period associated with the key has not passed.

At block 2318, calendar server 1204 determines whether or not the key is valid. If calendar server 1204 determines that the key is not valid (the "No" branch from block 2318), then at block 2320, calendar server 1204 returns an error. In an exemplary implementation, if the key was submitted as part of a cookie, then calendar server 1204 may modify the cookie to remove the invalid key. Alternatively, calendar server 1204 may also return data that instructs the requesting application to request a new, valid key.

On the other hand, if calendar server 1204 determines that the key is valid (the "Yes" branch from block 2318), then at block 2322 calendar server 1204 returns the requested data associated with the first user in response to the request received on behalf of the second user.

Conclusion

The techniques described above enable data sharing and support for related tasks within an instant messaging session. Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method comprising:
    establishing on behalf of a first user, an instant messaging session between the first user and a second user, wherein the instant messaging session comprises a peer-to-peer connection between a first user client device executing an instant messaging application and a second user client device;
    sending a request on behalf of the first user from the first user client device to a calendar server for a key configured to provide access to data associated with the first user;
    receiving the key at the first user client device from the calendar server;
    transmitting the key, via the instant messaging session, to the second user, thereby enabling the second user to access the data associated with the first user;
    determining, by the first user client device that the key has expired;
    requesting, by the first user client device, a new key from the calendar server;
    receiving a new, valid key at the first user client device from the calendar server;
    providing calendar data of the first user to a display of the first user client device;
    providing calendar data of the second user to the display of the first user client device, wherein the calendar data of the first user and the calendar data of the second user are provided to the display simultaneously; and
    providing a plurality of options to the first user via the display of the first user client device, wherein each of the options is selectable to provide a different level of detail of the calendar data of the first user that is displayed to the second user.

2. The method as recited in claim 1 wherein the key is encrypted.

3. The method as recited in claim 1 wherein the key is configured to expire after a specified period of time.

4. The method as recited in claim 1 wherein the key is configured to expire upon termination of the instant messaging session.

5. The method as recited in claim 1 wherein the calendar data of the first user represents meetings or other events that the first user is scheduled to attend.

6. The method as recited in claim 5 further comprising:
    transmitting to a calendar server, a request from an instant messaging application on behalf of the first user, to schedule a meeting; and
    transmitting an invitation to attend the meeting to the second user via the instant messaging session.

7. The method as recited in claim 6, further comprising:
    receiving via the instant messaging session, an indicator that the second user has accepted the invitation; and
    transmitting to the calendar server, an indicator that the meeting has been accepted.

8. The method as recited in claim 6, further comprising:
    receiving via the instant messaging session, an indicator that the second user has declined the invitation; and
    transmitting to the calendar server, an indicator that the meeting has been declined.

9. The method as recited in claim 1, further comprising:
    determining that the key has expired based on receiving a request from the second user client device for a new key.

10. The method as recited in claim 1 further comprising receiving a key from the second user via the instant messaging session, the key from the second user enabling the first user to access data associated with the second user.

11. The method as recited in claim 10 further comprising adding the key from the second user to a key store associated with the first user.

12. One or more computer-readable media having computer-readable instructions thereon which, when executed by a computer, cause the computer to implement the method as recited in claim 1.

13. A method comprising:
    receiving a request at a calendar server from an instant messaging application of a first user client device on behalf of a first user, the request being for a key to access data associated with the first user;
    generating the key at the calendar server;
    returning the key to the first user client device from the calendar server in response to receiving the request;
    receiving a request at the calendar server from an instant messaging application of a second user client device on behalf of a second user after receiving the request from the instant messaging application of the first user client device, the request being to access the data associated with the first user, wherein the request includes the key;
    verifying at the calendar server that the key is valid;
    in an event that the key is valid, in response to receiving the request on behalf of the second user, returning the data associated with the first user to the second user client device from the calendar server;
    determining, at the calendar server, that permissions designated by the first user have changed, wherein the permissions indicate a level of detail of calendar data of the first user that is displayed to the second user; and
    directing, at the calendar server, the instant messaging application of the first user client device to request a new key in response to determining that the permissions designated by the first user have changed.

14. The method as recited in claim 13 wherein the verifying that the key is valid comprises:
    searching an aggregated set of keys for a particular key, based on the request to access the data associated with the first user; and
    in an event that the particular key is identified, verifying that the particular key is valid.

15. The method as recited in claim 13 wherein the calendar data of the first user represents meetings or other events that the first user is scheduled to attend.

16. The method as recited in claim 15, further comprising:
    receiving a request from the instant messaging application on behalf of the first user to schedule a meeting, the request including details associated with the meeting; and
    in response to the request, returning data that causes an invitation associated with the meeting to be transmitted via the instant messaging session from the first user to the second user.

17. The method as recited in claim 16, further comprising adding the meeting to the calendar data associated with the first user.

18. The method as recited in claim 16, further comprising adding the meeting to calendar data associated with the second user.

19. The method as recited in claim 16, further comprising:
receiving from the instant messaging application on behalf of the second user, an indicator that the second user has accepted the invitation to attend the meeting; and
in response to receiving the indicator, returning to the instant messaging application, summary data associated with the meeting.

20. The method as recited in claim 19, further comprising in response to receiving the indicator, adding the meeting to calendar data associated with the second user.

21. The method as recited in claim 16, further comprising:
receiving from the instant messaging application on behalf of the first user, an indicator that the second user has declined the invitation to attend the meeting;
removing the meeting from the calendar data associated with the first user; and
in response to receiving the indicator, returning to the instant messaging application, summary data indicating that the meeting has been removed from the first user's calendar data.

22. The method as recited in claim 21, further comprising removing the meeting from calendar data associated with the second user.

23. The method as recited in claim 13 further comprising:
receiving a request from the instant messaging application on behalf of the second user, the request being to register the key to access data associated with the first user;
verifying that the key to access data associated with the first user is valid; and
adding the key to access data associated with the first user to an aggregated set of keys associated with the second user.

24. One or more computer-readable media having computer-readable instructions thereon which, when executed by a computer, cause the computer to implement the method as recited in claim 13.

25. A system comprising:
a processor;
means executable by the processor for establishing an instant messaging session between a first user and a second user, wherein the instant messaging session is between a first user client device and a second user client device;
means executable by the processor for obtaining on behalf of the first user a key to access data associated with the first user, wherein the key is obtained by the first user client device from a calendar server;
means executable by the processor for providing the key from the first user client device to the second user client device via the instant messaging session, thereby granting the second user access to the data associated with the first user;
means executable by the processor for determining, by the first user client device that the key has expired;
means executable by the processor for requesting, by the first user client device, a new key from the calendar server;
means executable by the processor for receiving a new, valid key at the first user client device from the calendar server.

26. The system as recited in claim 25 further comprising means for enabling the second user to perform a task based on the data associated with the first user.

27. The system as recited in claim 26 wherein the task comprises modifying the data associated with the first user.

28. The system as recited in claim 25 wherein the data associated with the first user comprises calendar data.

29. The system as recited in claim 28 further comprising:
means for enabling the second user to schedule a meeting to be attended by both the first user and the second user; and
means for transmitting a meeting invitation from the second user to the first user via the instant messaging session.

30. One or more computer-readable media comprising computer-readable instructions which, when executed by a processor, cause a computer system to perform acts comprising:
establish an instant messaging session between a first user and a second user, wherein the instant messaging session comprises a connection between a first user client device and a second user client device;
send a first request from the first user client device to a calendar server for a first key to access data associated with the first user;
receive the first key at the first user client device from the calendar server;
transmit the first key via the instant messaging session to the second user, thereby granting the second user access to the data associated with the first user;
determine, by the first user client device, that the first key has expired;
request, by the first user client device, a new key from the calendar server;
receive a new, valid key at the first user client device from the calendar server;
receive a second key at the first user client device via the instant messaging session, the second key to access data associated with the second user;
transmit an additional request from the first user client device to the calendar server for display preferences associated with the first user, the display preferences relating to a manner of displaying the data associated with the first user to the second user;
receive the display preferences at the first user client device from the calendar server; and
transmit the display preferences to the second user via the instant messaging session.

31. The one or more computer-readable media as recited in claim 30, wherein the data associated with the first user comprises calendar data, further comprising computer-readable instructions which, when executed by the processor, cause the computer system to receive via the instant messaging session, an invitation to a meeting scheduled by the second user.

32. The one or more computer-readable media as recited in claim 31, further comprising computer-readable instructions which, when executed by the processor, cause the computer system to transmit via the instant messaging session, an indication that the first user has accepted the meeting invitation.

33. The one or more computer-readable media as recited in claim 31, further comprising computer-readable instructions which, when executed by the processor, cause the computer system to transmit via the instant messaging session, an indication that the first user has declined the meeting invitation.

34. One or more computer-readable media comprising computer-readable instructions which, when executed by a processor, cause a computer system to perform acts comprising:

receive a first request at a calendar server from a first user client device for a data access key, the data access key being configured to provide access to calendar data associated with a first user participating in an instant messaging session with a second user;

in response to the first request, provide the data access key from the calendar server to the first user client device;

receive a second request at the calendar server from the second user for the calendar data associated with the first user, the second request including the data access key;

verifying at the calendar server that the key is valid;

in an event that the key is valid, and in response to the second request, provide the calendar data associated with the first user from the calendar server to the second user via a second user client device; and sending the calendar data of the first user and calendar data of the second user from the calendar server to the first user client device in response to receiving a calendar data request from the first user client device, wherein the calendar data of the second user sent to the first user client device is different from calendar data of the second user sent to the second user client device.

35. The one or more computer-readable media as recited in claim 34, further comprising computer-readable instructions which, when executed by the processor, cause the computer system to perform acts comprising:

receive a request from the second user to schedule a meeting; and add the meeting to the calendar data associated with the second user.

36. The one or more computer-readable media as recited in claim 35, further comprising computer-readable instructions which, when executed by the processor, cause the computer system to add the meeting to the calendar data associated with the first user.

37. The one or more computer-readable media as recited in claim 35, further comprising computer-readable instructions which, when executed by the processor, cause the computer system to perform acts comprising:

receive a meeting declined indicator from a participant associated with the instant messaging session; and remove the meeting from the calendar data associated with the second user.

38. The one or more computer-readable media as recited in claim 37, further comprising computer-readable instructions which, when executed by the processor, cause the computer system to remove the meeting from the calendar data associated with the first user.

39. The one or more computer-readable media as recited in claim 34, further comprising computer-readable instructions which, when executed by the processor, cause the computer system to perform acts comprising:

receive a request from the second user to register the data access key; and in response to the request, adding the data access key to a key store associated with the second user.

40. The method of claim 1, wherein a first option of the plurality of options is selectable to display to the second user details regarding events of a calendar of the first user, wherein a second option of the plurality of options is selectable to display to the second user whether the first user is free or busy at particular times, and wherein a third option of the plurality of options is selectable to display to the second user a representation of the calendar of the first user without indicators of scheduled events of the first user.

\* \* \* \* \*